(12) United States Patent
Tenzer

(10) Patent No.: US 11,474,072 B2
(45) Date of Patent: Oct. 18, 2022

(54) METHOD AND APPARATUS FOR DATA INDEPENDENT COMBINED ION MOBILITY AND MASS SPECTROSCOPY ANALYSIS

(71) Applicant: Bruker Daltonics GmbH & Co. KG, Bremen (DE)

(72) Inventor: Stefan Tenzer, Mainz (DE)

(73) Assignee: Bruker Daltonics GmbH & Co. KG, Bremen (DE)

(*) Notice: Subject to any disclaimer, the term of this patent is extended or adjusted under 35 U.S.C. 154(b) by 0 days.

(21) Appl. No.: 17/389,821

(22) Filed: Jul. 30, 2021

(65) Prior Publication Data

US 2022/0034840 A1 Feb. 3, 2022

(30) Foreign Application Priority Data

Jul. 31, 2020 (EP) .................................... 20188946
Nov. 9, 2020 (EP) .................................... 20206446

(51) Int. Cl.
*G01N 27/623* (2021.01)
*H01J 49/00* (2006.01)
*H01J 49/42* (2006.01)

(52) U.S. Cl.
CPC .......... *G01N 27/623* (2021.01); *H01J 49/004* (2013.01); *H01J 49/0031* (2013.01); *H01J 49/4215* (2013.01)

(58) Field of Classification Search
CPC .. G01N 27/623; H01J 49/0031; H01J 49/004; H01J 49/4215; H01J 49/0027
USPC ........................................ 250/281, 282, 288
See application file for complete search history.

(56) References Cited

FOREIGN PATENT DOCUMENTS

| EP | 3 185 276 A1 | 6/2017 | |
|---|---|---|---|
| GB | 2 523 222 A | 8/2015 | |
| GB | 2523222 A * | 8/2015 | ........... G01N 27/622 |
| GB | 2 529 912 A | 3/2016 | |
| GB | 2 553 398 A | 3/2018 | |
| WO | WO 2013/140132 A2 | 9/2013 | |
| WO | WO 2015/071647 A2 | 5/2015 | |
| WO | WO 2015/071648 A2 | 5/2015 | |

OTHER PUBLICATIONS

European Patent Office, Extended European Search Report, Application No. 20206446.5, dated May 6, 2021, 5 pages.

* cited by examiner

*Primary Examiner* — Michael Maskell
(74) *Attorney, Agent, or Firm* — Sunstein LLP

(57) ABSTRACT

An apparatus and a method of data independent combined ion mobility and mass spectroscopy analysis includes introducing precursor ions into an ion mobility spectrometer (IMS), sequentially releasing precursor ions from said IMS according to their ion mobility, introducing said released precursor ions into a mass filter, fragmenting the precursor ions transmitted through said mass filter to generate fragment ions, and carrying out a mass spectroscopy measurement on said fragment ions. The IMS and mass filter are controlled in a synchronized manner to carry out a plurality of IM scans, wherein adjacent mass windows in said IM scan that are associated with consecutive mass spectroscopy measurements of fragment ions overlap, such that precursor ions transmitted through said mass filter during said IM scan are located in at least one continuous scan region in an m/z-IM plane which extends in a generally diagonal direction in said m/z-IM plane.

34 Claims, 24 Drawing Sheets

| TOF Push Number | Mass Window Start | Mass Window End | TOF Push Number | MIDIA Frame Number | | | | | | | | | |
|---|---|---|---|---|---|---|---|---|---|---|---|---|---|
| | | | | 0 | 1 | 2 | 3 | 4 | 5 | 6 | 7 | 8 | 9 |
| 49 | 421.4 | 661.4 | 49 | 439.4 | 451.4 | 463.4 | 475.4 | 487.4 | 499.4 | 511.4 | 523.4 | 535.4 | 547.4 |
| 50 | 422.7 | 662.7 | 50 | 440.7 | 452.7 | 464.7 | 476.7 | 488.7 | 500.7 | 512.7 | 524.7 | 536.7 | 548.7 |
| 51 | 424.0 | 664.0 | 51 | 442.0 | 454.0 | 466.0 | 478.0 | 490.0 | 502.0 | 514.0 | 526.0 | 538.0 | 550.0 |
| 52 | 425.2 | 665.2 | 52 | 443.2 | 455.2 | 467.2 | 479.2 | 491.2 | 503.2 | 515.2 | 527.2 | 539.2 | 551.2 |
| 53 | 426.5 | 666.5 | 53 | 444.5 | 456.5 | 468.5 | 480.5 | 492.5 | 504.5 | 516.5 | 528.5 | 540.5 | 552.5 |
| 54 | 427.7 | 667.7 | 54 | 445.7 | 457.7 | 469.7 | 481.7 | 493.7 | 505.7 | 517.7 | 529.7 | 541.7 | 553.7 |
| 55 | 429.0 | 669.0 | 55 | 447.0 | 459.0 | 471.0 | 483.0 | 495.0 | 507.0 | 519.0 | 531.0 | 543.0 | 555.0 |
| 56 | 430.2 | 670.2 | 56 | 448.2 | 460.2 | 472.2 | 484.2 | 496.2 | 508.2 | 520.2 | 532.2 | 544.2 | 556.2 |
| 57 | 431.5 | 671.5 | 57 | 449.5 | 461.5 | 473.5 | 485.5 | 497.5 | 509.5 | 521.5 | 533.5 | 454.5 | 557.5 |
| 58 | 432.7 | 672.7 | 58 | 450.7 | 462.7 | 474.7 | 486.7 | 498.7 | 510.7 | 522.7 | 534.7 | 546.7 | 558.7 |
| 59 | 434.0 | 674.0 | 59 | 452.0 | 464.0 | 476.0 | 488.0 | 500.0 | 512.0 | 524.0 | 536.0 | 548.0 | 560.0 |
| 60 | 435.2 | 675.2 | 60 | 453.2 | 465.2 | 477.2 | 489.2 | 501.2 | 513.2 | 525.2 | 537.2 | 549.2 | 561.2 |
| 61 | 436.5 | 676.5 | 61 | 454.5 | 466.5 | 478.5 | 490.5 | 502.5 | 514.5 | 526.5 | 538.5 | 550.5 | 562.5 |
| 62 | 437.7 | 677.7 | 62 | 455.7 | 467.7 | 479.7 | 491.7 | 503.7 | 515.7 | 527.7 | 539.7 | 551.7 | 563.7 |
| 63 | 439.0 | 679.0 | 63 | 457.0 | 469.0 | 481.0 | 493.0 | 505.0 | 517.0 | 529.0 | 541.0 | 553.0 | 565.0 |
| 64 | 440.3 | 680.3 | 64 | 458.3 | 470.3 | 482.3 | 494.3 | 506.3 | 518.3 | 530.3 | 542.3 | 554.3 | 566.3 |
| 65 | 441.5 | 681.5 | 65 | 459.5 | 471.5 | 483.5 | 495.5 | 507.5 | 519.5 | 531.5 | 543.5 | 555.5 | 567.5 |
| 66 | 442.8 | 682.8 | 66 | 460.8 | 472.8 | 484.8 | 496.8 | 508.8 | 520.8 | 532.8 | 544.8 | 556.8 | 568.8 |
| 67 | 444.0 | 684.0 | 67 | 462.0 | 474.0 | 486.0 | 498.0 | 510.0 | 522.0 | 534.0 | 546.0 | 558.0 | 570.0 |
| 68 | 445.3 | 685.3 | 68 | 463.3 | 475.3 | 487.3 | 499.3 | 511.3 | 523.3 | 535.3 | 547.3 | 559.3 | 571.3 |
| 69 | 446.5 | 686.5 | 69 | 464.5 | 476.5 | 488.5 | 500.5 | 512.5 | 524.5 | 536.5 | 548.5 | 560.5 | 572.5 |

Fig. 11

|  |  |  | Window size | 36 |
|---|---|---|---|---|
|  |  |  |  |  |
|  |  |  |  |  |
| PASEF | IMI | Set Mass | left | right |
| 3 | 60 | 474.9 | 456.9 | 492.9 |
| 3 | 61 | 476.2525 | 458.2525 | 494.2525 |
| 3 | 62 | 447.605 | 459.605 | 495.605 |
| 4 | 53 | 478.7275 | 460.7275 | 496.7275 |
| 3 | 63 | 478.9575 | 460.9575 | 496.9575 |
| 4 | 54 | 480.095 | 462.095 | 498.095 |
| 3 | 64 | 480.31 | 462.31 | 498.31 |
| 4 | 55 | 481.4625 | 463.4625 | 499.4625 |
| 3 | 65 | 481.6625 | 463.6625 | 499.6625 |
| 4 | 56 | 482.83 | 464.83 | 500.83 |
| 4 | 57 | 484.1975 | 466.1975 | 502.1975 |
| 4 | 58 | 485.565 | 467.565 | 503.565 |
| 4 | 59 | 486.9325 | 468.9325 | 504.9325 |
| 4 | 60 | 488.3 | 470.3 | 506.3 |
| 4 | 61 | 489.6675 | 471.6675 | 507.6675 |
| 4 | 62 | 491.035 | 473.035 | 509.035 |
| 5 | 53 | 492.0225 | 474.0225 | 510.0225 |
| 4 | 63 | 492.4025 | 474.4025 | 510.4025 |
| 5 | 54 | 493.405 | 475.405 | 511.405 |
| 4 | 64 | 493.77 | 475.77 | 511.77 |
| 5 | 55 | 494.7875 | 476.7875 | 512.7875 |
| 4 | 65 | 495.1375 | 477.1375 | 513.1375 |
| 5 | 56 | 496.17 | 478.17 | 514.17 |
| 5 | 57 | 497.5525 | 479.5525 | 515.5525 |
| 5 | 58 | 498.935 | 480.935 | 516.935 |
| 5 | 59 | 500.3175 | 482.3175 | 518.3175 |
| 5 | 60 | 501.7 | 483.7 | 519.7 |
| 5 | 61 | 503.0825 | 485.0825 | 521.0825 |
| 5 | 62 | 504.465 | 486.465 | 522.465 |
| 6 | 53 | 505.3175 | 487.3175 | 523.3175 |
| 5 | 63 | 505.8475 | 487.8475 | 523.8475 |
| 6 | 54 | 506.715 | 488.715 | 524.715 |
| 5 | 64 | 507.23 | 489.23 | 525.23 |
| 6 | 55 | 508.1125 | 490.1125 | 526.1125 |
| 5 | 65 | 508.6125 | 490.6125 | 526.6125 |
| 6 | 56 | 509.51 | 491.51 | 527.51 |
| 6 | 57 | 510.975 | 492.9075 | 528.9075 |
| 6 | 58 | 512.305 | 494.305 | 530.305 |
| 6 | 59 | 513.7025 | 495.7025 | 531.7025 |
| 6 | 60 | 515.1 | 497.1 | 533.1 |
| 6 | 61 | 516.4975 | 498.4975 | 534.4975 |

| MIDIA 8 | | | Precursor Ion Mass | | | | | | | | | | |
|---|---|---|---|---|---|---|---|---|---|---|---|---|---|
| IMI | Left Edge | Right edge | 548.5 | 549.0 | 549.5 | 550.0 | 550.5 | 551.0 | 551.5 | 552.0 | 552.5 | 553.0 | 553.5 |
| 273 | 558.5 | 594.5 | 0 | 0 | 0 | 0 | 0 | 0 | 0 | 0 | 0 | 0 | 0 |
| 274 | 556.0 | 592.0 | 0 | 0 | 0 | 0 | 0 | 0 | 0 | 0 | 0 | 0 | 1 |
| 275 | 553.5 | 589.5 | 0 | 0 | 0 | 0 | 0 | 1 | 2 | 6 | 14 | 32 | 60 |
| 276 | 551.0 | 587.0 | 1 | 2 | 6 | 14 | 32 | 60 | 88 | 106 | 114 | 118 | 119 |
| 277 | 548.5 | 584.5 | 60 | 88 | 106 | 114 | 118 | 119 | 120 | 120 | 120 | 120 | 120 |
| 278 | 546.0 | 582.0 | 119 | 120 | 120 | 120 | 120 | 120 | 120 | 120 | 120 | 120 | 120 |
| 279 | 543.5 | 579.5 | 120 | 120 | 120 | 120 | 120 | 120 | 120 | 120 | 120 | 120 | 120 |
| 280 | 541.0 | 577.0 | 120 | 120 | 120 | 120 | 120 | 120 | 120 | 120 | 120 | 120 | 120 |
| 281 | 538.5 | 574.5 | 120 | 120 | 120 | 120 | 120 | 120 | 120 | 120 | 120 | 120 | 120 |
| 282 | 536.0 | 572.0 | 120 | 120 | 120 | 120 | 120 | 120 | 120 | 120 | 120 | 120 | 120 |
| 283 | 533.5 | 569.5 | 120 | 120 | 120 | 120 | 120 | 120 | 120 | 120 | 120 | 120 | 120 |
| 284 | 531.0 | 567.0 | 120 | 120 | 120 | 120 | 120 | 120 | 120 | 120 | 120 | 120 | 120 |
| 285 | 528.5 | 564.5 | 120 | 120 | 120 | 120 | 120 | 120 | 120 | 120 | 120 | 120 | 120 |
| 286 | 526.0 | 562.0 | 120 | 120 | 120 | 120 | 120 | 120 | 120 | 120 | 120 | 120 | 120 |
| 287 | 523.5 | 559.5 | 120 | 120 | 120 | 120 | 120 | 120 | 120 | 120 | 120 | 120 | 120 |
| 288 | 521.0 | 557.0 | 120 | 120 | 120 | 120 | 120 | 120 | 120 | 119 | 119 | 118 | 116 |
| 289 | 518.5 | 554.5 | 120 | 120 | 119 | 119 | 118 | 116 | 114 | 111 | 106 | 98 | 88 |
| 290 | 516.0 | 552.0 | 116 | 114 | 111 | 106 | 98 | 88 | 75 | 60 | 45 | 32 | 22 |
| 291 | 513.5 | 549.5 | 88 | 75 | 60 | 45 | 32 | 22 | 14 | 9 | 6 | 4 | 2 |
| 292 | 511.0 | 547.0 | 22 | 14 | 9 | 6 | 4 | 2 | 1 | 1 | 0 | 0 | 0 |
| 293 | 508.5 | 544.5 | 2 | 1 | 1 | 0 | 0 | 0 | 0 | 0 | 0 | 0 | 0 |
| 294 | 506.0 | 542.0 | 0 | 0 | 0 | 0 | 0 | 0 | 0 | 0 | 0 | 0 | 0 |
| 295 | 503.5 | 539.5 | 0 | 0 | 0 | 0 | 0 | 0 | 0 | 0 | 0 | 0 | 0 |
| 296 | 501.0 | 537.0 | 0 | 0 | 0 | 0 | 0 | 0 | 0 | 0 | 0 | 0 | 0 |
| 297 | 498.5 | 534.5 | 0 | 0 | 0 | 0 | 0 | 0 | 0 | 0 | 0 | 0 | 0 |
| 298 | 496.0 | 532.0 | 0 | 0 | 0 | 0 | 0 | 0 | 0 | 0 | 0 | 0 | 0 |

Fig. 21

| MIDIA 9 | | | Precursor Ion Mass | | | | | | | | | |
|---|---|---|---|---|---|---|---|---|---|---|---|---|
| IMI | Left Edge | Right edge | 548.5 | 549.0 | 549.5 | 550.0 | 550.5 | 551.0 | 551.5 | 552.0 | 552.5 | 553.0 | 553.5 |
| 273 | 570.5 | 606.5 | 0 | 0 | 0 | 0 | 0 | 0 | 0 | 0 | 0 | 0 | 0 |
| 274 | 568.0 | 604.0 | 0 | 0 | 0 | 0 | 0 | 0 | 0 | 0 | 0 | 0 | 0 |
| 275 | 565.5 | 601.5 | 0 | 0 | 0 | 0 | 0 | 0 | 0 | 0 | 0 | 0 | 0 |
| 276 | 563.0 | 599.0 | 0 | 0 | 0 | 0 | 0 | 0 | 0 | 0 | 0 | 0 | 0 |
| 277 | 560.5 | 596.5 | 0 | 0 | 0 | 0 | 0 | 0 | 0 | 0 | 0 | 0 | 0 |
| 278 | 558.0 | 594.0 | 0 | 0 | 0 | 0 | 0 | 0 | 0 | 0 | 0 | 0 | 0 |
| 279 | 555.5 | 591.5 | 0 | 0 | 0 | 0 | 0 | 0 | 0 | 0 | 0 | 1 | 2 |
| 280 | 553.0 | 589.0 | 0 | 0 | 0 | 0 | 1 | 2 | 6 | 14 | 32 | 60 | 88 |
| 281 | 550.5 | 586.5 | 2 | 6 | 14 | 32 | 60 | 88 | 106 | 114 | 118 | 119 | 120 |
| 282 | 548.0 | 584.0 | 88 | 106 | 114 | 118 | 119 | 120 | 120 | 120 | 120 | 120 | 120 |
| 283 | 545.5 | 581.5 | 120 | 120 | 120 | 120 | 120 | 120 | 120 | 120 | 120 | 120 | 120 |
| 284 | 543.0 | 579.0 | 120 | 120 | 120 | 120 | 120 | 120 | 120 | 120 | 120 | 120 | 120 |
| 285 | 540.5 | 576.5 | 120 | 120 | 120 | 120 | 120 | 120 | 120 | 120 | 120 | 120 | 120 |
| 286 | 538.0 | 574.0 | 120 | 120 | 120 | 120 | 120 | 120 | 120 | 120 | 120 | 120 | 120 |
| 287 | 535.5 | 571.5 | 120 | 120 | 120 | 120 | 120 | 120 | 120 | 120 | 120 | 120 | 120 |
| 288 | 533.0 | 569.0 | 120 | 120 | 120 | 120 | 120 | 120 | 120 | 120 | 120 | 120 | 120 |
| 289 | 530.5 | 566.5 | 120 | 120 | 120 | 120 | 120 | 120 | 120 | 120 | 120 | 120 | 120 |
| 290 | 528.0 | 564.0 | 120 | 120 | 120 | 120 | 120 | 120 | 120 | 120 | 120 | 120 | 120 |
| 291 | 525.5 | 561.5 | 120 | 120 | 120 | 120 | 120 | 120 | 120 | 120 | 120 | 120 | 120 |
| 292 | 523.0 | 559.0 | 120 | 120 | 120 | 120 | 120 | 120 | 120 | 120 | 120 | 120 | 120 |
| 293 | 520.5 | 556.5 | 120 | 120 | 120 | 120 | 120 | 120 | 119 | 119 | 118 | 116 | 114 |
| 294 | 518.0 | 554.0 | 120 | 119 | 119 | 118 | 116 | 114 | 111 | 106 | 98 | 88 | 75 |
| 295 | 515.5 | 551.5 | 114 | 111 | 106 | 98 | 88 | 75 | 60 | 45 | 32 | 22 | 14 |
| 296 | 513.0 | 549.0 | 75 | 60 | 45 | 32 | 22 | 14 | 9 | 6 | 4 | 2 | 1 |
| 297 | 510.5 | 546.5 | 14 | 9 | 6 | 4 | 2 | 1 | 1 | 0 | 0 | 0 | 0 |
| 298 | 508.0 | 544.0 | 1 | 1 | 0 | 0 | 0 | 0 | 0 | 0 | 0 | 0 | 0 |

Fig. 22

METHOD AND APPARATUS FOR DATA INDEPENDENT COMBINED ION MOBILITY AND MASS SPECTROSCOPY ANALYSIS

CROSS-REFERENCE TO RELATED APPLICATIONS

This application claims the benefit of European patent application number 20188946.6 filed Jul. 31, 2020 and European patent application number 20206446.5 filed Nov. 9, 2020, the disclosures of which are incorporated herein by reference in their entireties.

FIELD OF THE INVENTION

The present invention is in the field of mass spectroscopy. More particularly, the present invention relates to a method of data independent combined ion mobility and mass spectroscopy analysis.

BACKGROUND OF THE INVENTION

Mass spectrometry-based proteomics has become powerful technology for the identification and quantification of thousands of proteins. However, the coverage of complete proteomes is very challenging due to the limited speed, sensitivity and resolution of current mass spectrometers. In bottom-up proteomics, peptides are typically separated by liquid chromatography with elution peak widths in the range of seconds, while mass spectra are acquired in about 100 μs with time-of-flight (TOF) instruments. This allows adding ion mobility as a third dimension of separation in between. In Meier et al. *Online parallel accumulation—serial fragmentation (PASEF) with a novel trapped ion mobility mass spectrometer*, http://dx.doi.org/10.1101/336743, a scan mode termed parallel accumulation-serial fragmentation (PASEF) has been described which utilizes the timsTOF Pro instrument of Bruker Daltonik, an apparatus that combines a trapped ion mobility spectrometer with a quadrupole mass filter and a time-of-flight mass analyzer. This scanning mode has been found to allow for high sequencing speed at good sensitivity.

However, the PASEF scanning mode in its original form is per se a so-called data-dependent acquisition mode, where particular precursors are sequentially selected. In particular for screening or clinical applications, so-called data independent acquisition (DIA) schemes are preferred, in which groups of ions are recursively isolated by the mass filter and concurrently fragmented, thereby generating convoluted fragment ion spectra composed of fragments from many different precursors. A data-independent variant of the PASEF method, referred to as diaPASEF, is described in Florian Meier et al., *Parallel accumulation—serial fragmentation combined with data-independent acquisition (diaPASEF): bottom-up proteomics with near optimal ion usage*, BioarXiv doi: https://doi.org/10.1101/656207. In this work, also a deconvolution scheme for the mass spectra is described. The deconvolution comprises associating the fragments found in the mass spectrum with a corresponding precursor. Nevertheless, the deconvolution in the diaPASEF scheme remains challenging. For example, using mass windows with a width of 25 Da for the mass window of the quadrupole mass filter, in a proteomic analysis of a tryptic digest of the proteome of a human cell line, up to a thousand precursors were found in an ion mobility range in which a typical precursor may typically occur, which makes the deconvolution a very difficult task.

SUMMARY OF THE INVENTION

A problem underlying the invention is to provide a method and an apparatus for data independent combined ion mobility and mass spectroscopy analysis, which allows for an improved association of detected fragments with corresponding precursor ions. This problem is solved by a method according to claim 1 and an apparatus according to claim 8. Preferable embodiments are defined in the dependent claims.

According to one aspect of the invention, the problem is solved by a method comprising the following steps:

introducing precursor ions into an ion mobility separator (IMS), also referred to as ion mobility spectrometer in the art, sequentially releasing precursor ions from said IMS according to their ion mobility, introducing said released precursor ions into a mass filter which selectively transmits precursor ions having m/z values falling within a controllable mass selection window, fragmenting the precursor ions transmitted through said mass filter to generate fragment ions, carrying out a mass spectroscopy measurement on said fragment ions, wherein each fragment ion is associated with a mass window and an ion mobility (IM) range, and associating detected fragments with its corresponding precursor ion.

Note that the "IM range" associated with said fragment ions is typically defined by a time interval during the sequential release of precursor ions from the IMS, wherein all precursor ions being released in this time interval will be subjected to the same mass spectroscopy measurement, for example associated with a same TOF push in a TOF mass analyzer. While reference is made to an IM range herein, the range is typically very narrow, such that one may also speak of an "IM value".

In the invention, said IMS and said mass filter are controlled in a synchronized manner such as to carry out a plurality of IM scans, during which precursor ions of increasing or decreasing IM are successively released from said IMS, and during which the mass window of said mass filter is shifted continuously or stepwisely towards lower or higher m/z values, respectively. In said IM scans, adjacent mass windows that are associated with consecutive mass spectroscopy measurements of target ions overlap with each other, for example by at least 10%, preferably by at least 30%, more preferably by at least 60% and most preferably by at least 90% of their width, such that the precursor ions transmitted through said mass filter during said IM scan are located in at least one continuous scan region in an m/z-IM plane which extends in a generally diagonal direction in said m/z-IM plane. For example, the mass window could be shifted after every TOF push, or after a given number of TOF pushes, if a TOF mass analyzer is used. Adjacent scan regions associated with different IM scans overlap in the m/z-direction, for example by at least 33%, preferably at least 50% and most preferably at least 66% of their width in m/z direction. Moreover, said step of associating a detected fragment with its corresponding precursor ion is based on determining or utilizing the corresponding mass windows and IM ranges associated with various occurrences of said fragment in said mass spectrometry measurement.

Note that the "occurrence of a fragment" could in the simplest case be binary information, i.e. whether a fragment is found to be present in a given mass window and IM range or not. However, in practical embodiments, the "occurrence" may have a quantitative component, and may for example represent an intensity of the fragment in the mass spectroscopy measurement. Accordingly, in preferred embodiments, the occurrence of said fragment corresponds to a relative or absolute intensity of the fragment in the mass spectrometry measurement. Wherever in the following reference is made to the "occurrence of a fragment", this is to be understood as referring to either one of the binary information (fragment presence found/not found) and the quantitative information regarding an intensity of the fragment, without further mention.

According to the present invention, the scan region, i. e. the area covered in the m/z-IM plane in one IM scan is arranged generally diagonally. This generally diagonal scan region will also be referred to as "maximum information data independent acquisition (MIDIA)-frame" herein. The term "generally diagonal" is to be interpreted in a broad manner, and in particular does not necessarily require that the MIDIA extends along a straight line. Instead, the term "generally diagonal" mainly reflects the fact that in the continuous scan region, both the m/z range and the IM range concurrently varied.

The motivation for the generally diagonal orientation is that in many applications, the mass and the ion mobility of the precursors are correlated with each other. This means that for a given charge value z, precursors will typically be roughly distributed along a diagonal (possibly curved) line in the m/z-IM plane. Arranging the MIDIA frames generally along this diagonal direction hence allows for making optimum use of the available precursors in the scan.

While focusing on this diagonal region in the m/z-IM plane was already considered in the diaPASEF method referred to in the background of the invention, this area was nevertheless scanned using a plurality of disjunct "vertical" scans, referred to as "PASEF frame" herein, in which a certain mass window of the mass filter is held fixed and the IM value is scanned. Once the IM scan has covered the region of interest, the mass window is caused to jump by a multiple of its width to a new position, where the vertical scan is continued until the entire precursor ion mobility range is covered. In the next PASEF frame, different m/z ranges are targeted, which are not overlapping with previous or successive frames. While the MIDIA acquisition method described herein is a special type of diaPASEF, the terms "diaPASEF" and "PASEF frame" as used herein always refer to the way the method has been carried out in the prior art, while the new acquisition method is referred to as "MIDIA" herein.

The reason for the use of vertical frames in prior art is that this is the operation mode for which the equipment actually used for carrying out the diaPASEF procedure in the prior art was devised. At first sight, the skilled person would also not have seen any advantage in using diagonal scans, since the vertical diaPASEF scans likewise allow for covering the entire region of interest. Therefore, according to common wisdom, there would not have been any reason for taking the effort to reconstruct the available apparatus accordingly.

However, the inventor has noticed that using the diagonal MIDIA frames, indeed more information with respect to the precursor is encoded in the collective mass spectroscopy data acquired using the MIDIA frames as defined above. One reason for this increase in information has to do with the overlap of the MIDIA frames in m/z direction. Depending on the size of the overlap, each precursor may be reflected in more than one MIDIA frame. For example, in a preferred embodiment, adjacent MIDIA frames may overlap by ⅔ in m/z direction, which means that each precursor with a given m/z value would be represented in three different MIDIA frames. By identifying these MIDIA frames, the possible m/z range is then reduced to ⅓ of the size of the mass window of the individual MIDIA frames. Accordingly, the size of the mass windows can be chosen comparatively large, and typically 40-60% larger than in diaPASEF, thereby allowing for better sensitivity, while at the same time allowing for resolving the m/z value on a sub-mass-window scale.

A further reason for the increase of information is that even within a single MIDIA frame, the mass windows are shifted with respect to each other. It is seen that the precursors exhibit a certain spread or average extension $\Delta IM_{precursor}$ in the IM direction in the m/z plane, which means that the same precursor will be covered by different adjacent IM ranges within the same MIDIA frame, or in other words, be present in adjacent "subframes" thereof. Since these subframes will typically be shifted with respect to each other in m/z direction, the presence of a precursor in a selection of subframes encodes additional information about the m/z value thereof. This additional information is not captured in the data obtained with the prior art diaPASEF frames, where each precursor is only present in one and only one diaPASEF frame, and where the occurrence in plural subframes in any given PASEF frame due to the spread in IM direction does not provide any additional information with respect to the m/z value thereof.

In a preferred embodiment, said step of associating a detected fragment with its corresponding precursor ion is based on assessing the consistency of a tentative precursor with the mass windows and IM ranges associated with the various occurrences of said fragment in the mass spectroscopy measurement. As mentioned before, each fragment ion subjected to the mass spectroscopy is associated with a corresponding mass window and IM range associated with the mass filter and IMS, respectively, or in other words, with a corresponding subframe of a MIDIA frame. Then, if a specific fragment is found to occur in the mass spectroscopy data and the occurrences of the fragment can be associated with a set of MIDIA subframes, it can be checked whether these MIDIA subframes are consistent with a tentative precursor.

In a preferred embodiment, said step of associating a detected fragment with its corresponding precursor ion comprises determining an intersection of mass windows associated with the occurrences of said fragment in said mass spectroscopy measurement, and identifying the corresponding precursor ion based at least in part on this intersection. This way, the mass or m/z value of the precursor ion can be determined with high specificity, and on a scale that is way below the width of the mass windows of the mass filter used. This is notably different from the diaPASEF scheme, where all of the mass windows in which the specific fragment ever occurs—provided that it does indeed result from only one precursor—would be the same, and determining the intersection would not add any information. In determining the intersection of the mass windows, the corresponding IM ranges of values associated with the fragment can likewise be taken into consideration. The IM values of fragments belonging to the same precursor should be in a certain IM distribution width that is typically found for a single precursor.

In a preferred embodiment, the method further comprises a step of carrying out mass spectroscopy measurements in an operation mode, in which the mass filter and the fragmentation are deactivated, such that all precursor ions sequentially released from the IMS are subjected to mass spectroscopy without fragmentation, to thereby obtain m/z spectra as a function of ion mobility of the precursor ions. This mode of operation is often referred to as the MS1 mode in the art. In the MS1 mode, high resolution m/z spectra can be obtained, and also information about the spread or average extension $\Delta M_{precursor}$ of the precursors (i.e. the aforementioned "IM distribution width") in the m/z-IM plane can be discerned.

In a related embodiment, based on said m/z spectra of said precursor ions, a "fingerprint" of at least one precursor ion is established, which fingerprint comprises a set of mass windows and associated IM ranges among the mass windows and associated IM ranges covered by said IM scans which are consistent with the representation of said at least one precursor ion in said m/z spectra or, in other words, the location of the precursors in the m/z-IM plane. Herein, said step of associating a detected fragment with its corresponding precursor preferably comprises a step of establishing a set of mass windows and corresponding IM ranges of the mass filter and IMS associated with the occurrences of said detected fragment and comparing this set with the fingerprint of one or more precursors.

Herein, the "mass windows and corresponding IM ranges" may e.g. correspond to the aforementioned MIDIA subframes. However, the MS1 data is usually not collected in a scanning procedure using the overlapping MIDIA frames as employed in the MS2 measurement of the invention, so that the "fingerprint" which is essentially based on MIDIA subframes, cannot be directly discerned from the MS1 data.

Accordingly, in a preferred embodiment, the method further comprises a step of carrying out a "pseudo-MS2" measurement on precursor ions, in which said IMS and said mass filter are controlled in a synchronized manner such as to carry out the same type of overlapping IM scans as in the mass spectroscopy measurement on the fragment ions, but without fragmenting said precursor ions. Since the m/z of the precursor is conserved in the pseudo-MS2 measurement, the pseudo-MS2 measurement allows for correlating the MS1 measurement data and the "true" MS2 measurement data (including the fragmentation) with each other.

In a preferred embodiment, the step of associating a detected fragment with its corresponding precursor is based on a comparison, correlation or matching of said pseudo-MS2 data and true MS2 data obtained in said mass spectroscopy measurement on said fragment ions. Graphically speaking, the pseudo-MS2 includes the same information as the MS1 data, but in the "format" or data space of the MS2 measurement, making it particularly easy to compare, correlate or match the precursor information with the fragment information.

In an alternative embodiment, the method further comprises a step of predicting or calculating, based on the representation of a precursor in the MS1 mass spectroscopy measurement, an expected occurrence, in particular intensity distribution, for corresponding fragments with respect to at least IM range and number of IM scan among said plurality of IM scans, and said step of associating a detected fragment with its corresponding precursor is based on a comparison, correlation or matching of this expected occurrence, in particular intensity distribution, with true MS2 data obtained in said mass spectroscopy measurement on said fragment ions. Accordingly, in this embodiment, the MS1 mass spectroscopy data is converted into a format used for the acquisition of MS2 data, such as MIDIA subframes, to thereby allow for the comparison, correlation or matching.

In an alternative embodiment, the MS2 data may be converted into a format used in the MS1 measurement. For this purpose, the method comprises a step of predicting or calculating, based on "true" MS2 data obtained in said mass spectroscopy measurement for a given fragment (i.e. using the MIDIA mode), an expected intensity distribution for a possible precursor as a function of at least IM and m/z, and said step of associating a detected fragment with its corresponding precursor is based on a comparison, correlation or matching of this expected intensity distribution for the possible precursor with data obtained in said MS1 mass spectroscopy measurement.

In both of these embodiments, said step of predicting or calculating may be carried out using a model or algorithm that is based, at least in part, on one or more of a matrix-based method, a neural network, random forests, a support vector machine, or other methods of machine learning. Herein, said model or algorithm is preferably derived or trained, at least in part, using results of said pseudo-MS2 measurement as ground truth data.

As was explained above, the precursors typically have an elongate form in the m/z-IM plane, with an average extension $\Delta IM_{precursor}$ in the IM-direction. Moreover, a shift of the edges of adjacent scan regions of said IM scans with respect to each other in the m/z direction is accompanied by an offset $\Delta IM_{frame}$ of the edges in IM direction between the edges of adjacent scan regions. In preferred embodiments, the shift of adjacent scan regions is adapted to said average precursor extension $\Delta IM_{precursor}$ such that $\Delta IM_{precursor} \geq \Delta IM_{frame}$, preferably $\Delta IM_{precursor} \geq 1.2 \cdot \Delta IM_{frame}$, and most preferably $\Delta IM_{precursor} \geq 1.5 \cdot \Delta IM_{frame}$. This way, it can be ensured that each precursor is covered by at least two IM scans, and possibly by at least three IM scans, leading to a more characteristic "fingerprint" of the corresponding precursors and fragments.

In a preferred embodiment, said mass filter is a quadrupole RF device.

In a preferred embodiment, said IMS is a trapped IMS (TIMS) device. Herein, said TIMS device preferably comprises a first TIMS and a second TIMS, wherein said first TIMS is configured for constantly receiving precursor ions and transferring received precursor ions in a time controlled manner to the second TIMS, and said second TIMS is configured for carrying out said IM scans in which precursor ions are successively released from said second TIMS according to their ion mobility, and wherein preferably, in each IM scan, precursor ions of lower ion mobility are released prior to precursor ions of higher ion mobility. In other embodiments, the IMS may be a traveling wave IMS device or drift tube IMS, these IMS would require a rising m/z window due to a different separation principle. The IMS device preferably comprises an upstream trap which receives ions while the downstream IMS device is carrying out said IMS scan.

In a preferred embodiment, the method further comprises a step of providing said precursor ions by separating precursor molecules from a sample and ionizing said precursor molecules. This separation of precursor molecules from said sample is preferably carried out by chromatography, and more preferably by liquid chromatography. In preferred embodiments, said sample preferably comprises biological material, in particular one of peptides, lipids, metabolites or other small molecules in the mass range of 50-5000 Da. Further examples of the sample may comprise proteins, sugars, pesticides or drugs.

The precursor ions can be generated using one of spray ionization (e.g. electrospray (ESI) or thermal spray), desorption ionization (e.g. matrix-assisted laser/desorption ionization (MALDI) or secondary ionization), chemical ionization (CI), photo-ionization (PI), electron impact ionization (EI), or gas-discharge ionization.

The precursor ions can be fragmented by one of collision induced dissociation (CID), surface induced dissociation (SID), photo-dissociation (PD), electron capture dissociation (ECD), electron transfer dissociation (ETD), collisional activation after electron transfer dissociation (ETcD), activation concurrent with electron transfer dissociation (AI-ETD) and fragmentation by reactions with highly excited or radical neutral particles.

The fragment ions and/or precursor ions can be measured by one of a time-of-flight analyzer (e.g. with orthogonal ion injection), an electrostatic ion trap, an RF ion trap, and an ion cyclotron frequency ion trap.

According to a further aspect of the invention, an apparatus for data independent combined ion mobility and mass spectroscopy analysis is provided. Said apparatus comprises an ion mobility separator (IMS) for receiving and sequentially releasing precursor ions from said IMS according to their ion mobility, a mass filter arranged to receive said released precursor ions and to selectively transmit precursor ions having m/z values falling within a controllable mass window, a fragmentation device for fragmenting the precursor ions transmitted through said mass filter to generate fragment ions, an apparatus for carrying out a mass spectroscopy measurement on said fragment ions, wherein each fragment ion is associated with a mass window and an ion mobility (IM) range, and a control system. The control system is configured to control said IMS and said mass filter in a synchronized manner such as to carry out a plurality of IM scans, during which precursor ions of increasing or decreasing IM are successively released from said IMS, and during which the mass window of said mass filter is shifted continuously or stepwise towards lower or higher m/z values, respectively, wherein said control system (32) is configured to control said IMS (16) and said mass filter (26) in a synchronized manner such that, in said IM scans, adjacent mass windows that are associated with consecutive mass spectroscopy measurements of fragment ions overlap, for example by at least 10%, preferably by at least 30%, more preferably by at least 60% and most preferably by at least 90% of their width, such that the precursor ions transmitted through said mass filter during said IM scan are located in a at least one continuous scan region in an m/z-IM plane which extends in a generally diagonal direction in said m/z-IM plane. Herein, adjacent scan regions associated with different IM scans overlap in the m/z-direction, for example by at least 33%, preferably at least 50% and most preferably at least 66% of their width in m/z direction.

The apparatus may also comprise an ion source.

In a preferred embodiment, said control system is further configured for associating a detected fragment with its corresponding precursor ion based on assessing the consistency of a tentative precursor with the mass windows and IM ranges associated with the various occurrences of said fragment in the mass spectroscopy measurement.

In a preferred embodiment, said control system is further configured for associating a detected fragment with its corresponding precursor ion, wherein said associating preferably comprises determining an intersection of mass windows associated with observed occurrences of said fragment in the mass spectroscopy measurements, and identifying the corresponding precursor ions based at least in part on this intersection.

In a preferred embodiment, said control system is further configured for controlling the apparatus to carry out MS1 mass spectroscopy measurements in an operation mode, in which the mass filter and the fragmentation device are deactivated, such that all precursor ions sequentially released from the IMS are subjected to mass spectroscopy without fragmentation, to thereby obtain m/z spectra as a function of ion mobility of the precursor ions.

In a related embodiment, said control system is configured for establishing, based on said m/z spectra of said precursor ions, a fingerprint of at least one precursor ion, which fingerprint comprises a set of mass windows and associated IM ranges among the mass windows and associated IM ranges covered by said IM scans which are consistent with the representation of said at least one precursor ion (34) in said m/z spectra.

Herein, said control system is preferably configured for associating a detected fragment with its corresponding precursor, wherein said associating comprises establishing a set of mass windows and corresponding IM ranges of the mass filter and IMS associated with the occurrences of said detected fragment and comparing this set with the fingerprint of one or more precursors.

In a preferred embodiment of said apparatus, said control system is configured for controlling the apparatus to carry out a pseudo-MS2 measurement on precursor ions, in which said IMS and said mass filter are controlled in a synchronized manner such as to carry out the same type of overlapping IM scans as in the mass spectroscopy measurement on the fragment ions, but without fragmenting said precursor ions.

In a preferred embodiment of the apparatus, said control system is configured for associating a detected fragment with its corresponding precursor based on a comparison, correlation or matching of said pseudo-MS2 data and true MS2 data obtained in said mass spectroscopy measurement on said fragment ions.

In a preferred embodiment of the apparatus, said control system is configured for predicting or calculating, based on the representation of a precursor in the MS1 mass spectroscopy measurement, an expected occurrence, in particular intensity distribution, for corresponding fragments with respect to at least IM range and number of IM scan among said plurality of IM scans, and further configured to associate a detected fragment with its corresponding precursor based on a comparison, correlation or matching of this expected occurrence, in particular intensity distribution, with true MS2 data obtained in said mass spectroscopy measurement on said fragment ions.

In a preferred embodiment of the apparatus, said control system is configured for predicting or calculating, based on true MS2 data obtained in said mass spectroscopy measurement for a given fragment, an expected intensity distribution for a possible precursor as a function of at least IM and m/z, and further configured for associating a detected fragment with its corresponding precursor based on a comparison, correlation or matching of this expected intensity distribution for the possible precursor with data obtained in said MS1 mass spectroscopy measurement.

In a preferred embodiment of the apparatus, said control system is configured for carrying out said predicting or calculating using a model or algorithm based, at least in part, on one or more of a matrix-based method, a neural network, random forests, a support vector machine, or other methods of machine learning.

In a preferred embodiment, said mass filter is a quadrupole RF device.

In a preferred embodiment, said IMS is one of a trapped IMS (TIMS) device, a traveling wave IMS device and drift tube IMS. The mass spectroscopy apparatus can be one of a time-of-flight analyzer (e.g. with orthogonal ion injection), an electrostatic ion trap, an RF ion trap, and an ion cyclotron frequency ion trap.

In a preferred embodiment, said TIMS device comprises a first TIMS and a second TIMS, wherein said first TIMS is configured for constantly receiving precursor ions and transferring received precursor ions in a time controlled manner to the second TIMS, and said second TIMS is configured for carrying out said IM scans in which precursor ions are successively released from said second TIMS according to their ion mobility. Herein, in each IM scan, precursor ions of lower ion mobility are preferably released prior to precursor ions of higher ion mobility.

In a preferred embodiment, said apparatus further comprises a separator and an ionizing device for providing said precursor ions by separating precursor molecules from a sample and ionizing said precursor molecules. Said separator is preferably a chromatography device, and more preferably a liquid chromatography device (12). Said sample preferably comprises biological material, in particular one of peptides, lipids, metabolites or other small molecules in the mass range of 50-5000 Da.

in a preferred embodiment of the apparatus, the control system (32) is configured to control said IMS (16) and said mass filter (26) in a synchronized manner such that said precursors have an average extension $\Delta IM_{precursor}$ in said m/z-IM plane, a shift of the edges of adjacent scan regions of said IM scans with respect to each other in the m/z direction is accompanied by an offset $\Delta IM_{frame}$ of the edges in IM direction between the edges of adjacent scan regions, and the shift of adjacent scan regions is adapted to said average precursor extension $\Delta IM_{precursor}$ such that $\Delta IM_{precursor} \geq \Delta IM_{frame}$, preferably $\Delta IM_{precursor} \geq 1.2 \cdot \Delta IM_{frame}$, and most preferably $\Delta IM_{precursor} \geq 1.5 \cdot \Delta IM_{frame}$.

SHORT DESCRIPTION OF THE FIGURES

FIG. 11 is a table summarizing the location of MIDIA subframes of 10 different MIDIA frames in the m/z-IM plane and the consistency with a given precursor ion.

FIG. 12 is a table illustrating the specificity of the set of consistent subframes with respect to the m/z value.

FIG. 21 is a table summarizing the position of the edges of the mass window as a function of IMI and the corresponding transmission coefficients for selected values of m/z for the eighth MIDIA frame.

FIG. 22 is a table summarizing the position of the edges of the mass window as a function of IMI and the corresponding transmission coefficient for selected values of m/z for the ninth MIDIA frame.

DESCRIPTION OF THE PREFERRED EMBODIMENT

It is to be understood that both the foregoing general description and the following description are exemplary and explanatory only and are not restrictive of the methods and devices described herein. In this application, the use of the singular may include the plural unless specifically state otherwise. Also, the use of "or" means "and/or" where applicable or unless stated otherwise. Those of ordinary skill in the art will realize that the following description is illustrative only and is not intended to be in any way limiting. Other embodiments will readily suggest themselves to such skilled persons having the benefit of this disclosure. Reference will now be made in detail to various implementations of the example embodiments as illustrated in the accompanying drawings.

Figure 1:
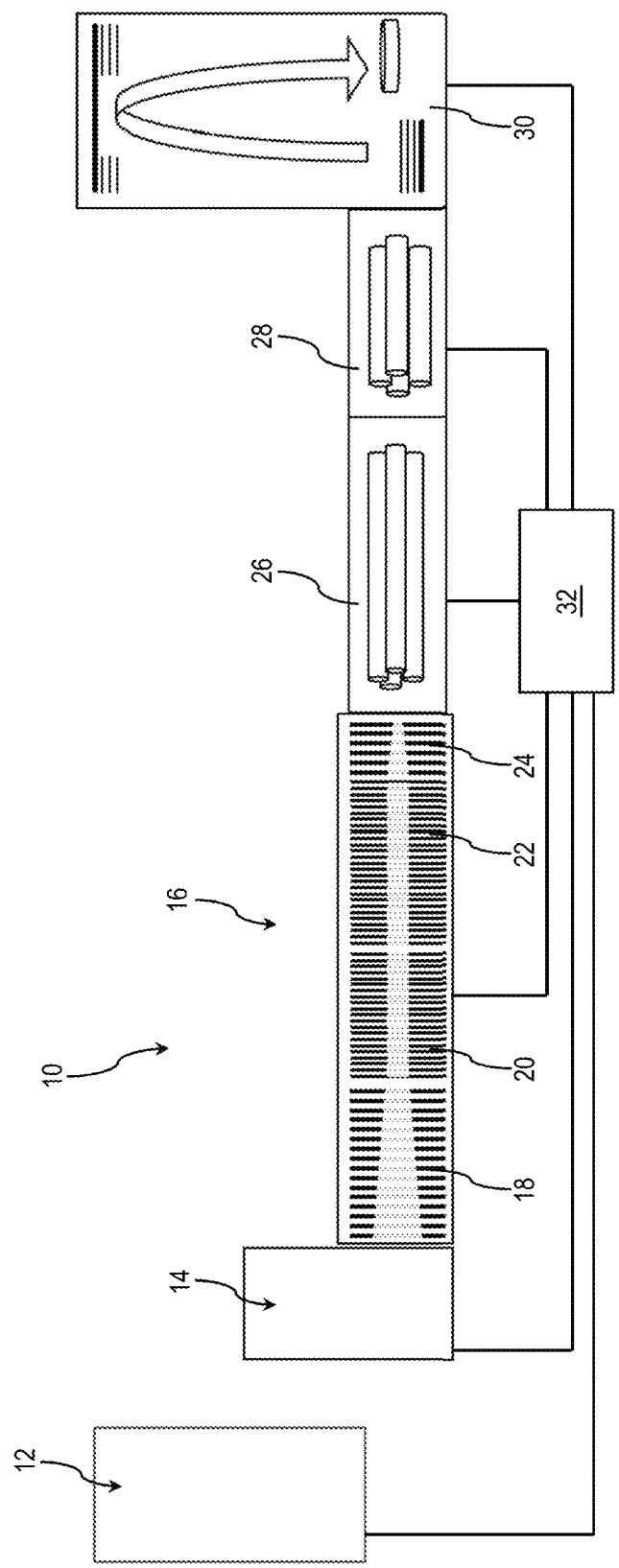
FIG. 1 is a schematic illustration of a system according to an embodiment of the invention.

In FIG. 1 a system 10 for data independent combined ion mobility and mass spectroscopy analysis shown. The system 10 comprises a sample separation device 12 for separating samples. The samples are typically biological samples, for example peptides. and the embodiment shown, the sample separation device 12 is a liquid chromatography device, but other separation devices may likewise be used, for example a gas chromatography device, a capillary electrophoresis separation device, or the like.

The separated samples, or more precisely substances of a sample, are introduced to an ion source 14 in which they are ionized, e. g. by electrospray ionization (ESI), matrix-assisted laser desorption/ionization (MALDI), or electron impact ionization (EI), to form precursor ions. The precursor ions are introduced into an ion mobility spectrometer or separator 16 which sequentially releases precursor ions according to their ion mobility. In the embodiment shown, the IMS 16 is a so-called trapped IMS (TIMS) device, in which ions are preferably captured by the opposing forces of a gas flow and a counteracting DC electric field along an axial direction. The ions are radially confined by electric RF fields. The TIMS device 16 shown comprises an entrance funnel 18, a first TIMS 20, a second TIMS 22, and an exit funnel 24. Herein, the first TIMS 20 is configured for constantly receiving precursor ions and transferring received precursor ions in a time controlled manner to the second TIMS 22. The second TIMS (22) is configured for carrying out IM scans in which precursor ions are successively released from the second TIMS 22 according to their ion mobility. In the embodiment shown, in each IM scan, precursor ions of lower ion mobility are released prior to precursor ions of higher ion mobility. In other embodiments, the IMS may be a traveling wave IMS device (TWIMS) or drift tube IMS (DT-IMS). These IMS would release precursor ions of higher ion mobility prior to precursor ions of lower ion mobility due to a different separation principle.

Downstream of the IMS 16, a mass filter is provided. The mass filter 26 selectively transmits precursor ions having m/z values falling within a controllable mass selection window. In the shown embodiment, the mass filter is a quadrupole RF device 26.

Precursor ions falling into the current mass window of the quadrupole RF device 26 are forwarded to a fragmentation apparatus 28 in which the precursor ions are fragmented into fragment ions. In the shown embodiment, the fragmentation apparatus is a collision cell 28. However, other types of fragmentation apparatus are likewise possible, such as surface induced dissociation fragmentation devices, electron transfer dissociation (ETD) devices, electron capture dissociation (ECD) devices, ultraviolet photo-induced dissociation (UVPD) or the like.

The system 10 further comprises a mass spectrometer 30, which carries out a mass spectroscopy measurement on the fragment ions. In the shown embodiment, the mass spectrometer is a time-of-flight (TOF) analyzer.

Finally, the system 10 comprises a control system 32 which is configured to control each of the components of the system 10 and to also carry out the data analysis of the mass spectra obtained by the TOF analyzer 30. The control system 32 comprises one or more microprocessors as well as a memory for storing suitable computer code for carrying out system control and data analysis functions. The control system 32 may be a single unit, or may be a distributed system comprising different control units with individual processors and and/or dedicated control circuits, ASICs or the like in data communication with each other.

Figure 2:
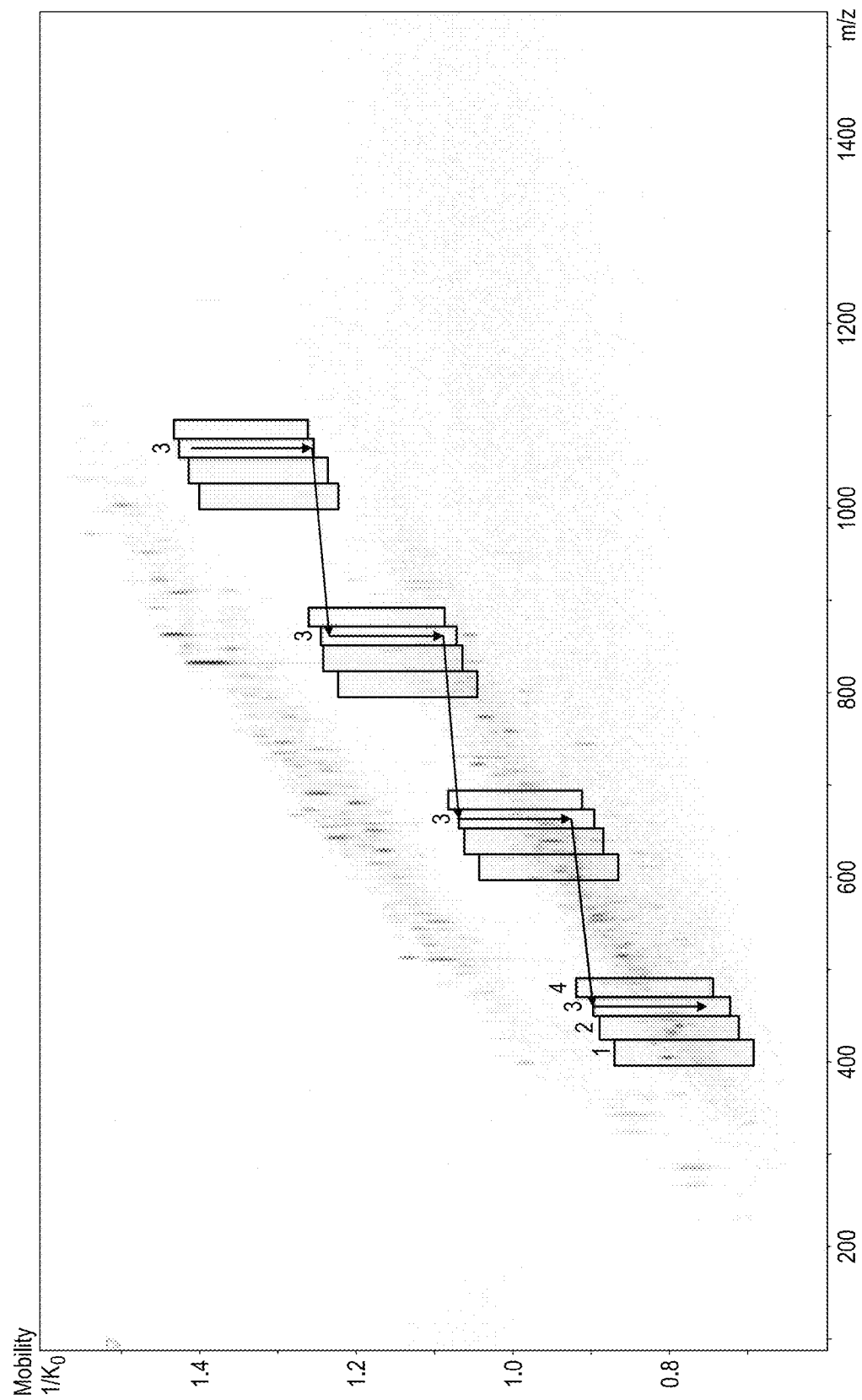
FIG. 2 shows the distribution of precursor ions in the m/z-IM plane, together with the location of PASEF frames and arrows indicating the procedure of the third IM scan in the diaPASEF method.

The system 10 shown in FIG. 1 can operate in two modes of operation, which are often referred to as the MS1 and MS2 (tandem MS or MS/MS) mode, respectively. If operated in the MS1 mode, the mass filter 26 and the collision cell 28 are deactivated, such that all precursor ions sequentially released from the second TIMS 22 are conveyed to the TOF analyzer 30 without mass selection or fragmentation, to thereby obtain high resolution m/z spectra as a function of ion mobility of the precursors. The precursors are further associated with a corresponding retention time of the chromatography device 12. An m/z-mobility diagram of observed/measured precursor ion intensities obtained in the MS1 mode is shown in FIG. 2. In the diagram of FIG. 2, the horizontal axis defines the m/z value of the precursor while the vertical axis defines the inverse ion mobility ($1/K_o$), such that larger values on the vertical axis correspond to lower mobilities. In the diagram of FIG. 2, individual precursors are represented by vertically elongated spots, i.e. with a certain spread in mobility direction, since ions accumulate in the TIMS device 16 with a certain spatial distribution resulting in the mobility measured with the TIMS device 16 for the same precursor exhibiting a certain variance. Namely, a precursor ion species released from the TIMS device 16 has a temporal pulse width, that may be in the range of a millisecond. The flight-time in the TOF analyzer is shorter than this TIMS pulse width such that multiple TOF spectra are measured for each released TIMS pulse.

As can be seen from the m/z-mobility diagram of FIG. 2, there is a correlation between the ion mobility and m/z value of the precursors, in that generally, the ion mobility decreases with increasing m/z value, such that the precursors are generally located in regions extending along two diagonal lines in the m/z-mobility diagram, where the two regions visible in FIG. 2 correspond to different charge states (z-values) of the ions.

This correlation between mass and mobility of the precursors has been exploited in a data-independent parallel accumulation-serial fragmentation (diaPASEF) method, which is described in Florian Meier et al., *Parallel accumulation—serial fragmentation combined with data-independent acquisition (diaPASEF): bottom-up proteomics with near optimal ion usage*, BioarXiv doi: https://doi.org/10.1101/656207. This method shall be explained with reference to FIGS. 2 and 3. The method comprises a number of IM scans during which precursor ions are successively released from the TIMS device 16 according to their mobility, starting at lower mobilities (larger inverse mobility values on the vertical axis of FIG. 2) and moving towards higher mobilities (i.e. downward in the diagram of FIG. 2). During each IM scan, a number of (typically two or four, as shown in the Figure) different mass windows of the quadrupole mass filter 26 are successively applied, to thereby cover only relevant portions of the m/z-mobility plane, i.e. regions in which precursors are to be found.

By way of example, the third IM scan out of a sequence of such IM scans is shown in FIG. 2: the scan starts at the highest inverse mobility value, while the mass window of the quadrupole mass filter 26 is kept fixed at a comparatively high value. The width of the mass window is chosen at 25 Da. All the precursors released from the TIMS device 16 and lying in this mass window will reach the collision cell 28, where they are fragmented. The fragments are subjected to TOF mass spectroscopy using the TOF analyzer 30. The TOF analyzer 30 records mass spectra of the available fragments one after the other, e.g. at a repetition rate of 10 kHz, where each of the mass spectra is associated with a corresponding TOF push. During the course of time, precursors of lower and lower inverse mobility values are released from the TIMS device 16, which is indicated by the rightmost vertically downward pointing arrow in FIG. 2, and—provided that they fit into the fixed mass window of the quadrupole mass filter 26—reach the collision cell 28 and consequently the TOF analyzer 30. Accordingly, a different ion mobility range or value is associated with each TOF push of the TOF analyzer 30.

Once the inverse mobility values drop below a region of interest, i. e. leaves the region where the predominant part of the precursor ions are expected, the mass window is shifted as indicated by the horizontal arrow pointing from right to left in FIG. 2. Then, the IM scan is continued in a different, shifted mass window. This procedure is continued as indicated in FIG. 2 for four different mass windows, each 25 Da wide. Each set of the rectangles acquired during a single TIMS separation/IM scan as shown in FIG. 2, where each rectangle covers a 25 Da mass window and a corresponding IM range, are referred to as a "diaPASEF frame" herein.

Figure 3:
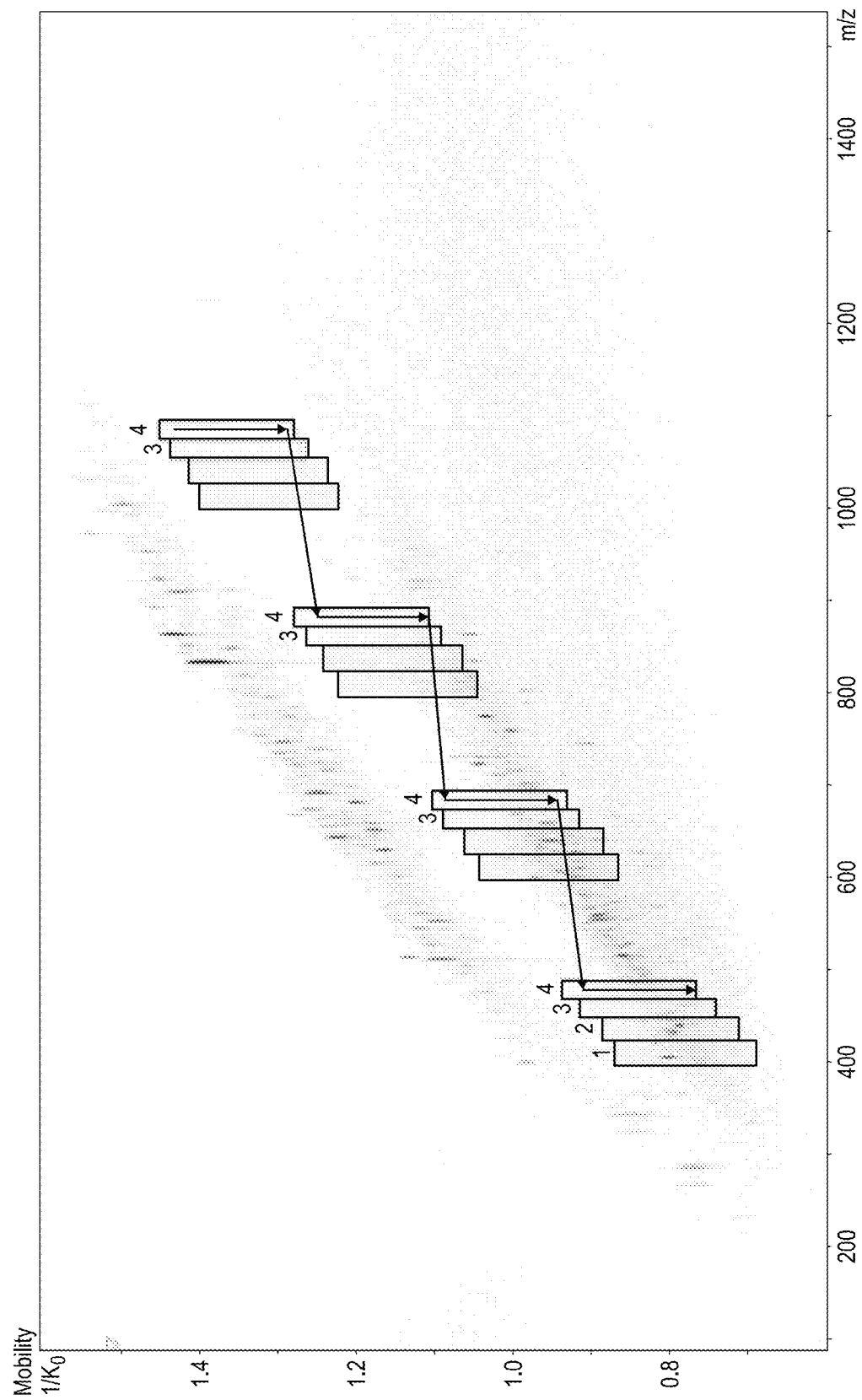
FIG. 3 shows the same distribution of precursor ions and the PASEF frames in the m/z-IM plane as in FIG. 2, but arrows indicating the procedure of the fourth IM scan in the diaPASEF method.

FIG. 3 illustrates the following fourth IM scan/diaPASEF frame. The fourth IM scan starts out with a mass window which is directly adjacent to the starting mass window of the third IM scan, and with a slightly higher inverse mobility, such as to cover the relevant portions in the m/z-IM plane. The fourth IM scan is likewise distributed over four disjunct mass windows. This procedure is continued until the entire range of interest is covered. The results of this procedure are encoded in a four-dimensional data space, comprising the time parameter of the separation device, e. g. a retention time of the liquid chromatography device 12, the m/z mass window, the ion mobility and the intensity. Targeted data extraction can then be carried out in four dimensions as described in the above article of Meier et al. The diaPASEF method is "data independent" in that it does not include any preparation or isolation of specific precursors. Instead, all precursors provided by the liquid chromatography device 12 are subjected to the PASEF method, and since the mass windows of the mass filter 26 are chosen to match the current ion mobility range, the degree of utilisation of the available precursor ions is comparatively high. Since this mode of operation of the device comprises two mass selection steps, namely the preselection by the mass window of the quadrupole mass filter 26 as well as the mass spectroscopy measurement of the fragment ions generated from the precursor in the collision cell 28 carried out by the TOF analyzer 30, this procedure represents the aforementioned MS/MS mode of operation.

In the currently best application of the diaPASEF procedure, 16 PASEF frames are used to cover the entire precursor ion space, with a mass window width of 25 Da and typically 150-500 TOF pushes per PASEF frame. For a TIMS accumulation time of 100 ms, the entire cycle time for covering the MS1 frame and all 16 diaPASEF frames is about 1.7 seconds. Since the diaPASEF frames do not overlap in m/z direction, each precursor is scanned only during one diaPASEF frame, resulting in a 5.88% duty cycle for the respective fragment ions.

Figure 4:
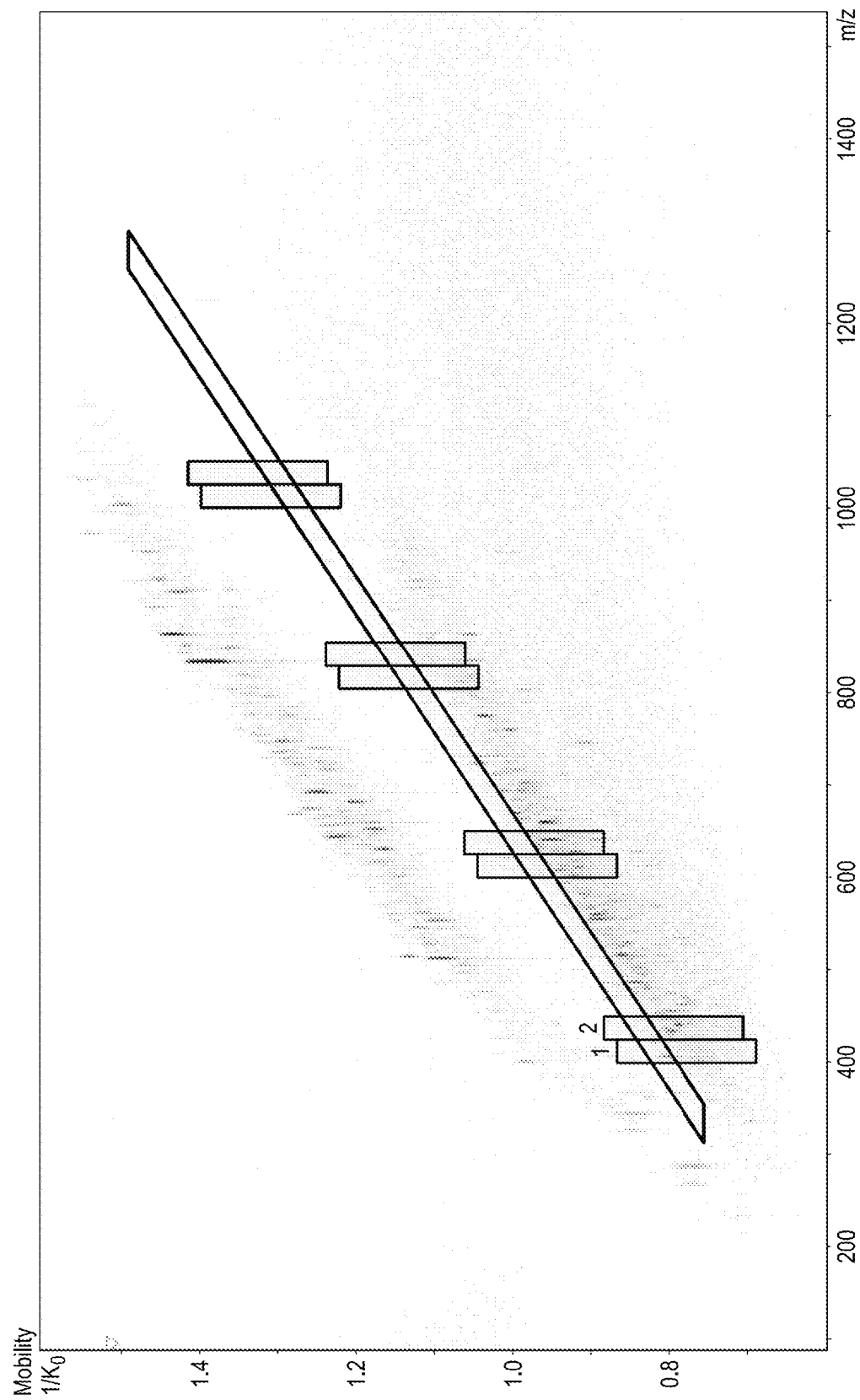
FIG. 4 shows the general location of a diagonal MIDIA frame in the m/z-IM plane.

Next, with reference to FIG. 4, the method according to an embodiment of the present invention is explained. FIG. 4 again shows the diaPASEF frames corresponding to the first and second IM scan in the m/z-ion mobility plane. Further shown is a diagonal frame of a type used in embodiments of the invention. The method of the invention will be referred to herein as "maximum information data independent acquisition (MIDIA)", and the corresponding diagonal frames are referred to as "MIDIA-frames". Each MIDIA frame is generated in the course of one IM scan, during which as before precursor ions of increasing mobility (shown as decreasing inverse mobility in the diagrams) are successively released from the TIMS device 16. For this reason, the terms "MIDIA frame" and "MIDIA scan" as used herein are synonymous. However, the mass window of said mass filter 26 is shifted continuously or stepwisely toward lower m/z values, such that adjacent mass windows in said IM scan that are associated with consecutive mass spectroscopy measurements of target ions overlap with each other, and such that all precursor ions transmitted from said mass filter during said IM scan are located in a continuous scan region (the MIDIA frames/scan) in the m/z-IM plane. This is different from the diaPASEF frames likewise shown in FIG. 4, where each IM scan is distributed over several disjunct mass windows within a diaPASEF frame, which are typically separated by a distance in m/z value that is a multitude of the mass window width itself.

As mentioned above, in the present invention, the mass window of the quadrupole mass filter 16 may be either shifted continuously or stepwisely. However, since the mass spectroscopy measurements on the fragments are carried out as discrete events, even in case of a continuous shift of the mass window, two consecutive mass spectroscopy measurements will be associated with different discrete mass window ranges, corresponding to the progress made of the continuously shifting mass window between two consecutive mass spectroscopy measurements, such as between two consecutive TOF pushes. This situation is indeed similar to that of the IM values, since the precursor ions are likewise continuously released from the TIMS device 16, and the IM value or IM range is only defined by the timing of successive TOF pushes with respect to the continuous release from the TIMS device 16.

Figure 5:
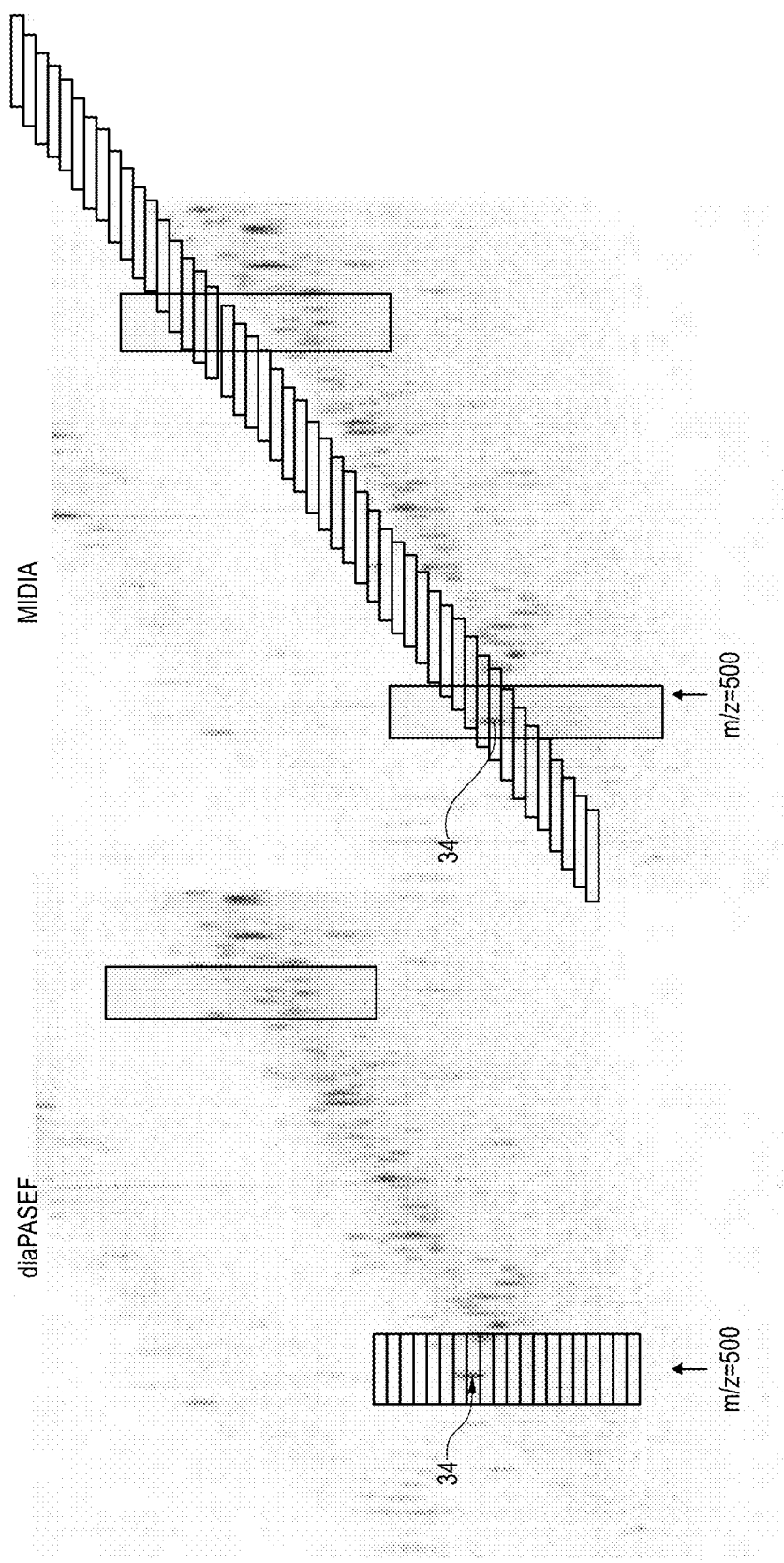
FIG. 5 is a close-up view of a diaPASEF and a MIDIA frame in the m/z-IM plane, both of which being divided into subframes according to IM value.

FIG. 5 shows a close-up view of a diaPASEF frame on the left and a MIDIA frame on the right, both located in the m/z-IM plane, where the precursors as obtained in an MS1 mode of operation of the apparatus 10 of FIG. 1 are again shown as vertically elongate spots. The diaPASEF frame is a part of a diaPASEF scan during which the mass window of 25 Dalton width is held in a fixed position. This diaPASEF frame is separated in vertical direction into 20 fields or "subframes" with regard to the ion mobility, wherein each of these fields or subframes corresponds to one TOF push. Within this diaPASEF frame, a certain sample precursor having an m/z value of 500 is shown at reference sign 34.

The MIDIA frame on the right corresponds to a full scan in the ion mobility. The MIDIA frame is likewise separated into fields or subframes, each having a width in the m/z dimension corresponding to the mass window of the quadrupole mass separator 26, and each corresponding to one TOF push. An IM value or range of the subframe is associated with the timing of the TOF push, or more generally, with the timing of the associated mass spectroscopy measurement to be carried out on the fragments of the precursor. The scan direction is again from higher to lower inverse mobilities (i.e. downward in the diagram), but unlike the diaPASEF frame on the left, the mass window of the quadrupole mass filter 26 is shifted between each TOF push. Whether this shift is carried out in steps or continuously is immaterial, what matters is that each of the mass spectroscopy measurements associated with subsequent TOF pushes are associated with different positions of the mass window. The mass windows employed for the exemplary MIDIA scan are 36 Da wide, and hence wider than those used in the diaPASEF (25 Da). Moreover, it is seen that the mass windows associated with consecutive TOF pushes (or more generally: consecutive mass spectroscopy measurements) largely overlap with each other. Since the variance of the IM values associated with most precursors, or in other words, the elongation of the spots representing the precursors in the m/z-IM diagram, exceeds the IM range covered by each subframe, the same precursor can be covered by different shifted subframes with different m/z windows. This fact allows for assessing information with regard to the m/z value of the precursor on a sub-mass-window resolution, as will be explained below.

While this is not envisaged in the preferred embodiment, in the method of the invention, it is also be conceivable to carry out a small number of TOF pushes without shifting the mass window in between, and only then shift the mass window. However, even in this case the mass windows associated with TOF pushes directly prior to and after the shift will overlap with each other. This is again different from the diaPASEF frames, where whenever the mass window is shifted, it is shifted to a position without overlap with the previous position. Moreover, the mass windows of the individual diaPASEF frames are chosen such that they do not significantly overlap, such that as a rule, each precursor will be present in one diaPASEF frame only.

Figure 6:
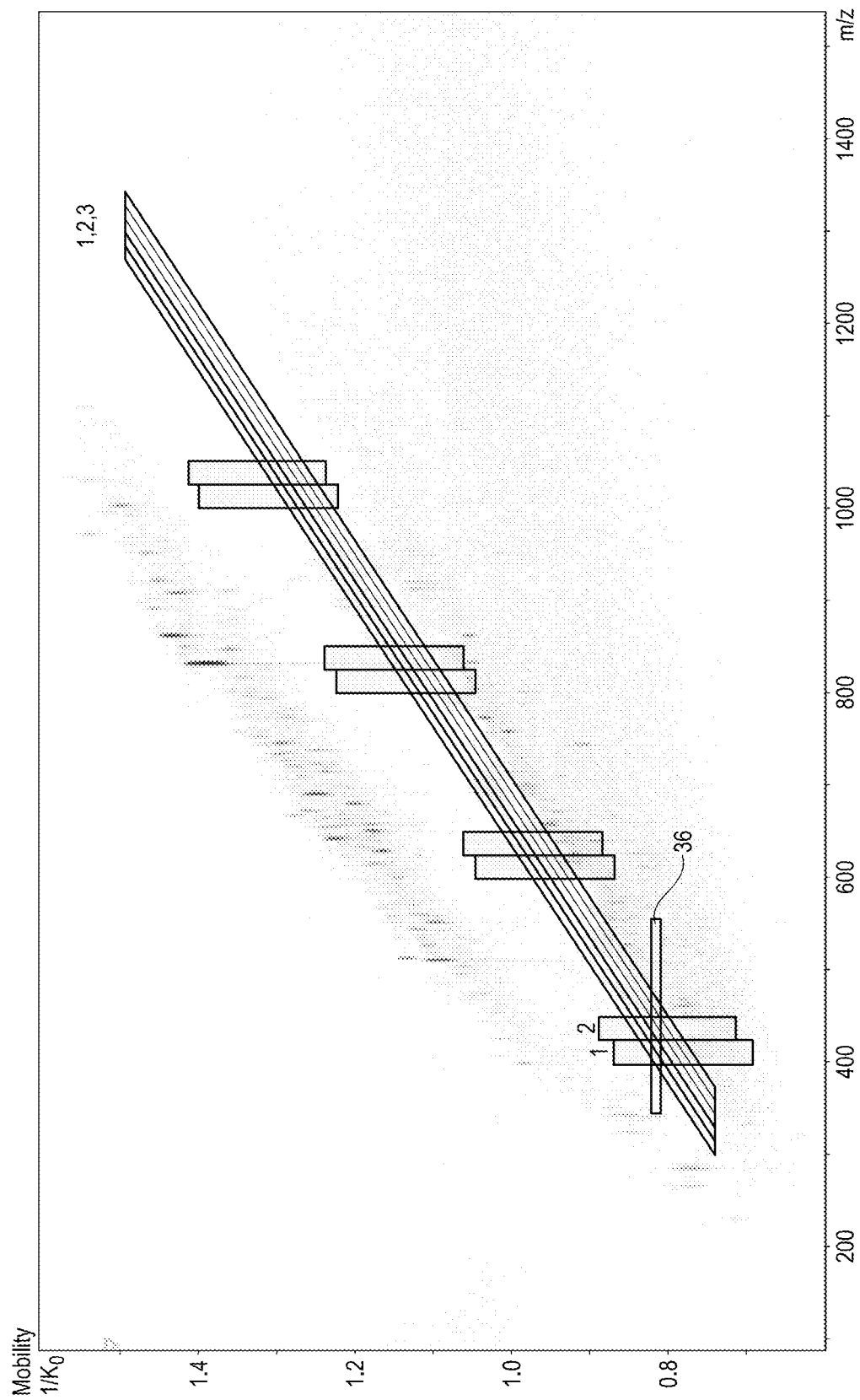
FIG. 6 shows the overlap of three diagonal MIDIA frames in the m/z-IM plane.

FIG. 6 is similar to FIG. 4, except that the location of the next two MIDIA scans, scans 2 and 3, are shown. Note that the numbering of the scans refers to their location in the m/z-IM plane, not (or not necessarily) to the order in which they are recorded. As is seen in FIG. 6, adjacent scan regions associated with the individual scans overlap with each other by approximately two thirds of the area. Namely, for a given IM value, the mass windows in adjacent MIDIA scans are shifted by 12 Da, i.e. by ⅓ of the mass window width of 36 Da. This overlap implies that each precursor will occur in three of the MIDIA frames in a corresponding IM range associated with the precursor. To understand this, one may focus on the horizontal region 36 indicated in FIG. 6 by the horizontal rectangle indicating a region associated with a certain IM value which is crossed by different MIDIA frames.

Figure 7:
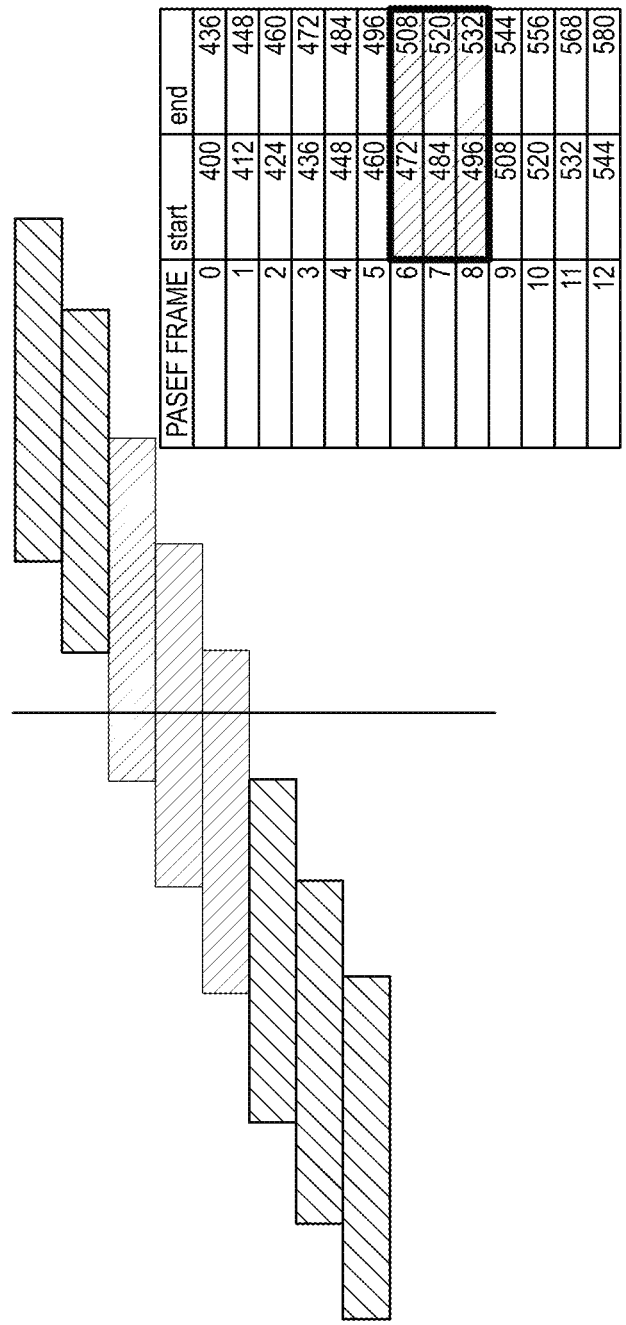
FIG. 7 illustrates the overlap of several MIDIA frames for a certain IM value and how the mass of the precursor can be determined on a subframe m/z resolution by its occurrence in various MIDIA frames.

In this horizontal region 36, adjacent MIDIA frames are shifted with respect to each other by 12 Da. This is indicated in FIG. 7, where the overlap of the respective MIDIA frames with the horizontal region 36 as indicated. Each of the rectangles corresponds to the intersection of one of the MIDIA frames with the horizontal region 36. In the m/z-IM diagram of FIG. 6, these regions would lie on top of each other, but in FIG. 6, they are shifted vertically to better distinguish them from each other.

Also shown in FIG. 7 is an exemplary table summarizing the number of each MIDIA frame, as well as the lower and upper boundaries ("start" and "end") with respect to the m/z value thereof when crossing the region 36. 12 MIDIA frames are represented in the table, covering an m/z range from 400 to 580 Da within the horizontal region 36. The precursor 34 having an m/z value of 500 Da will occur in three of the MIDIA frames, namely MIDIA frames 6, 7 and 8. It can therefore be concluded from the occurrence of the precursor in these three MIDIA frames within the narrow IM range defined by the horizontal region 36 that the mass must be between the start of the eighth subframe (496 Da) and the end of the sixth subframe (508 Da), i.e. in a m/z range of 12 Da. In comparison to this, in diaPASEF, each precursor will only occur in one diaPASEF frame, and while it may be present in different subframes (according to different IM values), no additional information with respect to the m/z value can be discerned from this. It is therefore seen that although the mass windows (36 Da) used in the MIDIA frames are wider than those used in diaPASEF (25 Da), the data acquired using the MIDIA acquisition scheme encodes more specific information about the m/z value of the precursor.

However, it will become apparent from the discussion of FIGS. 8 to 12 below that due to of the unique overlapping of MIDIA frames, the combinations of IM values and m/z values associated with individual subframes shifted in m/z direction (or in other words, the diagonal orientation of the MIDIA frames), the MIDIA data actually encodes information regarding the mass of precursor ions on a much higher resolution than just the third of an individual mass window, and in many cases up to on the order of a single Dalton only. This is especially true if additional information regarding the precise location of precursor ions in the m/z-IM plane and their spread in ion mobility is exploited, which can be readily obtained from MS1 measurements with the apparatus 10 that may be carried out concurrently with the MS/MS measurements.

FIG. 8 again shows for comparison on the left a diaPASEF frame of a first scan covering the exemplary precursor 34 at m/z equal to 500, and on the right a first MIDIA scan, which is seen to cover at least the upper edge of the corresponding intensity peak or "spot" in the m/z-IM plane. Moreover, since the intensity peak or "spot" is elongated in vertical (ion mobility) direction, it overlaps with different ones of the mutually shifted subframes of the first MIDIA scan, such that even this single MIDIA scan already includes m/z information at a resolution lower than the width of the individual mass windows, for similar reasons as was explained with reference to FIG. 7 above.

Figure 8:
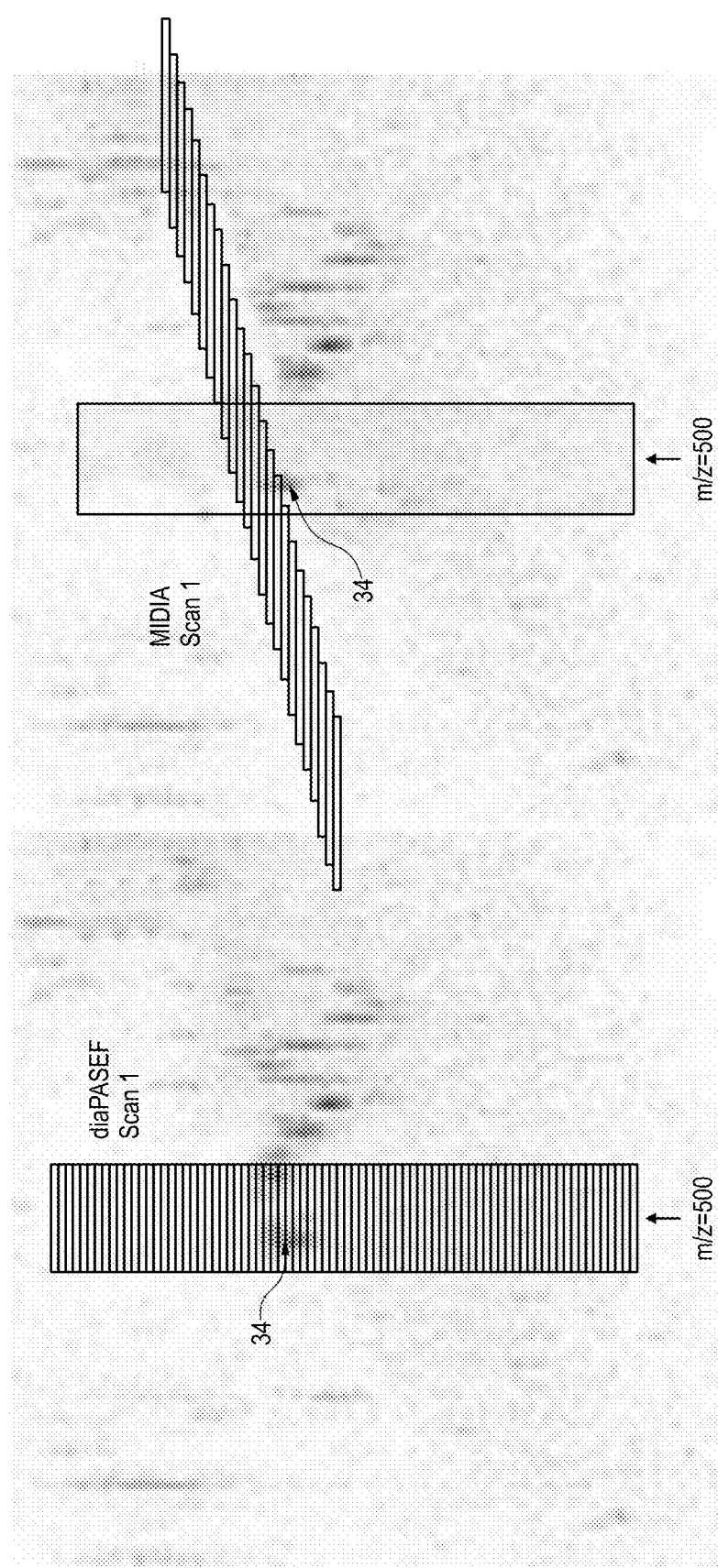
FIG. 8 shows the location of a first diaPASEF frame and a first MIDIA frame in the m/z-IM plane with respect to a precursor of interest.
Figure 9:
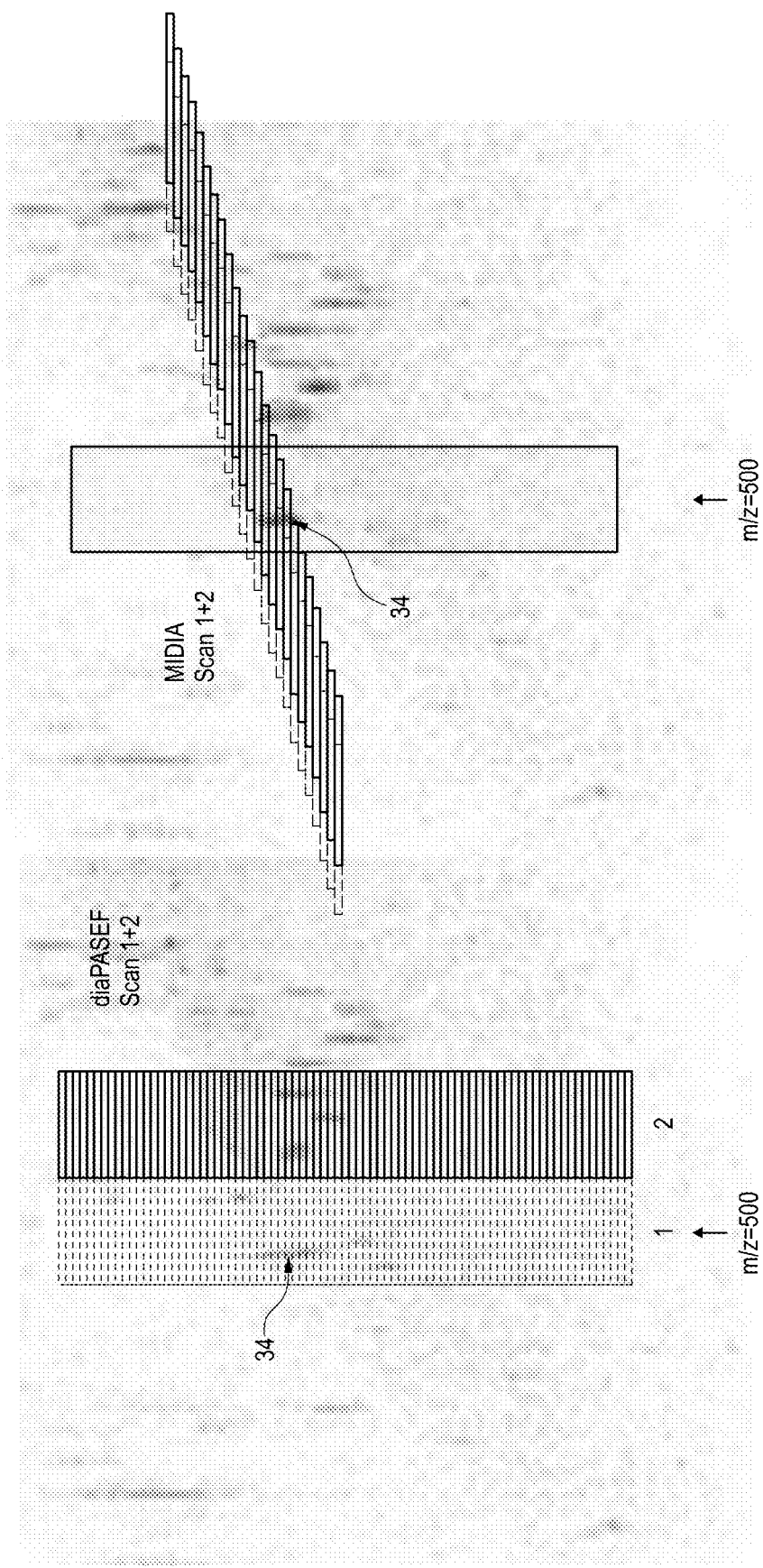
FIG. 9 shows the location of first and second diaPASEF frames and MIDIA frames in the m/z-IM plane with respect to a precursor of interest.
Figure 10:
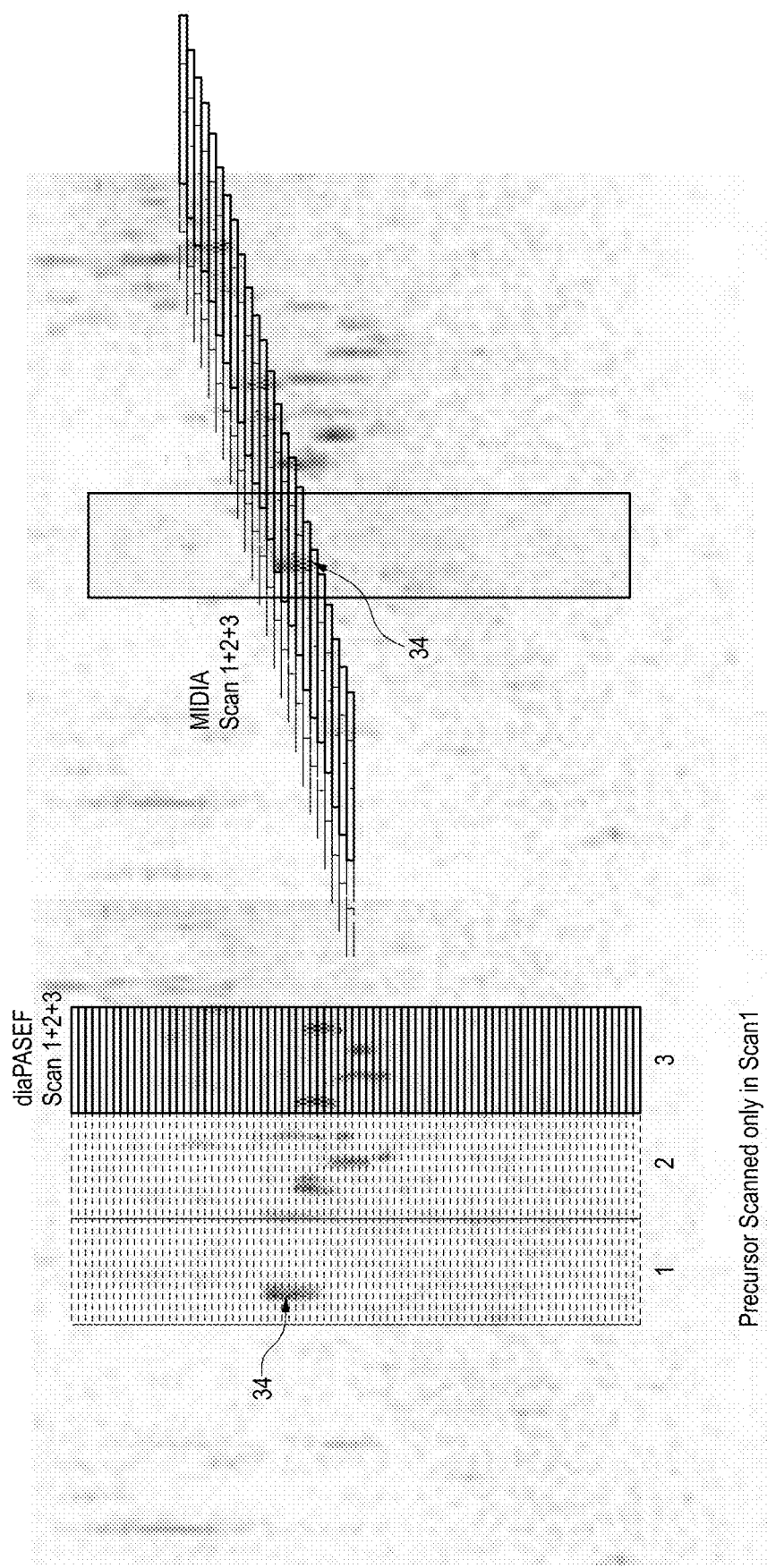
FIG. 10 shows the location of first to third diaPASEF frames and MIDIA frames in the m/z-IM plane with respect to a precursor of interest.

FIG. 9 shows again the first scans of FIG. 8 represented in dotted lines, but also the location of the adjacent "second" scans in solid lines. Again, the terms "first" and "second" do not or at least not necessarily refer to the order in which the scans are carried out, but rather to their location with respect to each other in the m/z-IM plane. As seen on the left of FIG. 9, the diaPASEF frame of the second scan covers a completely new m/z range, and hence can give no additional information regarding the m/z value of the precursor 34 of interest. The second MIDIA scan, however, covers most of the precursor peak of interest, and hence includes additional information with respect to the m/z value and ion mobility of the peak. Finally, FIG. 10 shows the first and the second scans in dotted lines, and the third scan in solid lines. Again, it is seen that the third MIDIA scan covers most of the precursor peak and hence includes additional information about its m/z value and ion mobility.

A typical task is to associate fragments that are identified in the mass spectroscopy measurement carried out by the TOF analyzer 30 with a corresponding precursor. Each measurement with the TOF analyzer 30 is associated with a corresponding subframe of a MIDIA scan or frame. Then, from the discussion of FIGS. 8 to 10, it is apparent that a specific precursor, such as the precursor 34, will be present in a plurality of subframes of a plurality of MIDIA scans or frames. If a specific fragment is detected to occur in a given set of mass spectroscopy measurements, the corresponding subframes of said plurality of MIDIA scans can be determined. The set of subframes defines a "fingerprint" of the precursor 34, by which its m/z value can be determined with a very high precision.

FIG. 11 is a table summarizing the locations of subframes within 10 MIDIA scans. The first column of the table recites a number of a TOF push, which can be regarded as an "ion mobility index" (IMI). Each integer number represents a certain ion mobility value or (small) ion mobility range.

The second and third columns designate, for each IM index, the lower and upper boundaries ("start/end") of the total mass window that is covered by the totality of the MIDIA frames.

The fourth column again recites the IM indices, but further indicates in bold font and shading the IM index values which can occur for the given precursor 34. Namely, as is seen e.g. in FIG. 8, the precursor 34 is represented by an elongate spot extending in vertical direction in the m/z-IM plane, which means that for the same precursor 34, a range of IM values can be measured with the TIMS device 16. For example, in FIG. 11 it is seen that the distribution of IM values is centered around an IM index of 59, but that the precursor may also be found in subframes corresponding to IM indices ranging from 53 to 65. The variance of this distribution of IM values can be obtained from the data recorded in the MS1 mode of operation.

The following columns 5 to 14 indicate the MIDIA frames 0 to 9. Each number within these columns indicates the center of the mass window of a corresponding subframe of the MIDIA frame for a given IM index. For example, in the fifth column, corresponding to the first MIDIA frame (MIDIA frame number 0), the number "445.7" indicates that the center of the mass window of the subframe in the first MIDIA frame corresponding to the IM index 54 is centered at an m/z value of 445.7, i.e. ranging from 427.7 to 463.7, since the mass window in this case is 36 Da wide.

In the columns representing the MIDIA frames, m/z values of those subframes are printed in bold font which could include the precursor 34 having an m/z value 500 Da. For example, in the column corresponding to the MIDIA frame number 5, at an IM index of 63, the m/z value of 517.0 is printed in bold font, because with a 36 Da wide mass window centered at this value, a precursor having an m/z value of 500 would still barely be transmitted by the quadrupole mass filter 26. However, the subframe of the same MIDIA frame number 5 corresponding to an IM index value of 64, with a mass window centered at 518.3 would no longer allow for the precursor 34 with m/z equal to 500 to reach the fragmentation cell 28, which is why this value is printed in normal font.

In the columns corresponding to the MIDIA frames, all of the subframes are highlighted by a corresponding frame and shaded that are consistent with both, the expected IM index range from 53 to 65 as well as the center of the mass window compatible with the precursor 34, which lies in an interval between 482 and 518. It is seen that as expected, the precursor 34 will be predominantly found in three MIDIA frames, namely the MIDIA frames number three, four and five, and possibly also in two subframes of the MIDIA frames 2 and 6.

The set of subframes in which the precursor 34 will be permitted to reach the fragmentation cell 28 can be regarded as a "fingerprint" of this precursor 34 in the MIDIA data. For example, assume that a specific fragment occurs in a number of mass spectroscopy measurements, and one wishes to check whether this fragment may be associated with the precursor 34. Since each mass spectroscopy measurement corresponds to a subframe of one of the MIDIA scans, it can be checked whether the occurrence of the fragment in various subframes is consistent with this "fingerprint". Herein, the criterion "consistent with the fingerprint" can be made a quantitative criterion using a statistical scoring scheme, resulting in a likelihood or probability value for an agreement as a function of the deviation of the fingerprint and the set of subframes in which the fragment has actually been found, thereby allowing to handle data noise that will necessarily occur. This statistical scoring scheme may comprise associating certain weights to certain deviations from the fingerprint. For example, if the fragment was not present in the mass spectroscopy measurement associated with the subframe of the fifth MIDIA frame for the IM index 59 (having a center of the mass window precisely matching the m/z value 500 of the precursor 34, and having an IM index which is in the middle of the ion mobility distribution of the precursor 34), this would make it very unlikely that the fragment is indeed associated with the precursor 34. On the other hand, if the fragment should be missing in subframes associated e.g. with IM indices at the boundary of the distribution, such as 53 or 65, this would not reduce the probability of the match significantly.

There are many ways how the "fingerprint" can be exploited in associating a fragment with its precursor, and the present invention is not limited to any specific one of them. This matching can even be carried out using machine learning algorithms, such as deep learning algorithms like convolutional neural networks which can be trained on real measurement data or simulated measurement data, for example by switching off the collision energy, thereby preserving intact precursor signals in the MIDIA frames which can be used as a ground truth dataset for algorithm training, as will be explained in more detail below.

However, as should have become apparent from the above discussion, the association of a detected fragment with its corresponding precursor ion is based on the information contained in the occurrence of the fragments in a plurality of MIDIA subframes, or in more general language, based on "determining or utilizing the corresponding mass windows and IM ranges associated with various occurrences of said fragment in the mass spectroscopy measurement", bearing in mind that each MIDIA subframe corresponds to a certain IM range (that may be parameterized by the ion mobility index IMI) and the corresponding mass window associated with the IMI in the given MIDIA scan. The occurrence of the fragment in a plurality of MIDIA subframes is highly specific to the corresponding precursor, and may hence serve as a "fingerprint" to associate the fragments with their precursor.

Note that for the sake of a more simple illustration, in the explanation above, the expression "occurrence" was used in the sense of a binary information as to whether a certain fragment is present in a MIDIA subframe or not. However, in practical embodiments, the "occurrence" may have a quantitative component, and may for example represent an intensity of the fragment in the TOF measurement associated with the MIDIA subframe. This "quantitative occurrence" or intensity represents additional information to the "fingerprint", which can be exploited in associating fragments with their precursors.

Moreover, again for the simplicity of illustration, in the above description, the retention time associated with the liquid chromatography device 12 has not been accounted for, i.e. the explanation was focused on the situation for one given retention time only. In general, the retention time defines a further dimension which is accounted for in the data analysis, as will become more apparent from the discussion below.

Irrespectively of the precise way the "fingerprint" is used in associating fragments with precursors, the fundamental question of course is how specific the fingerprint actually is with respect to pinning down the m/z value of a possible precursor. This can be discerned from the table shown in FIG. 12, where all subframes in the relevant m/z range occurring in any of the MIDIA scans are listed in order of increasing mass window center. Each subframe can be denoted by the corresponding number of the MIDIA scan to which it belongs and the corresponding IM index, listed in the first and second columns respectively. The third column denotes the center of the mass window, while the fourth and fifth columns denote the lower and upper boundaries, respectively. The remaining columns list possible m/z values of a potential precursor in steps of 0.2 Da. If precursor 34 (or another potential precursor with a given mass and IM index) falls into the subframe, this is indicated by a "1", if not, it is designated by a "0". Further in this table, some m/z ranges that are consistent with the same selection of subframes are enclosed by printed frames in the figure. This means that precursors within these m/z ranges exhibit the same "fingerprint", and that the width of the m/z range corresponding to the same fingerprint defines the potential specificity of the method with regard to determining m/z values.

Figure 12:
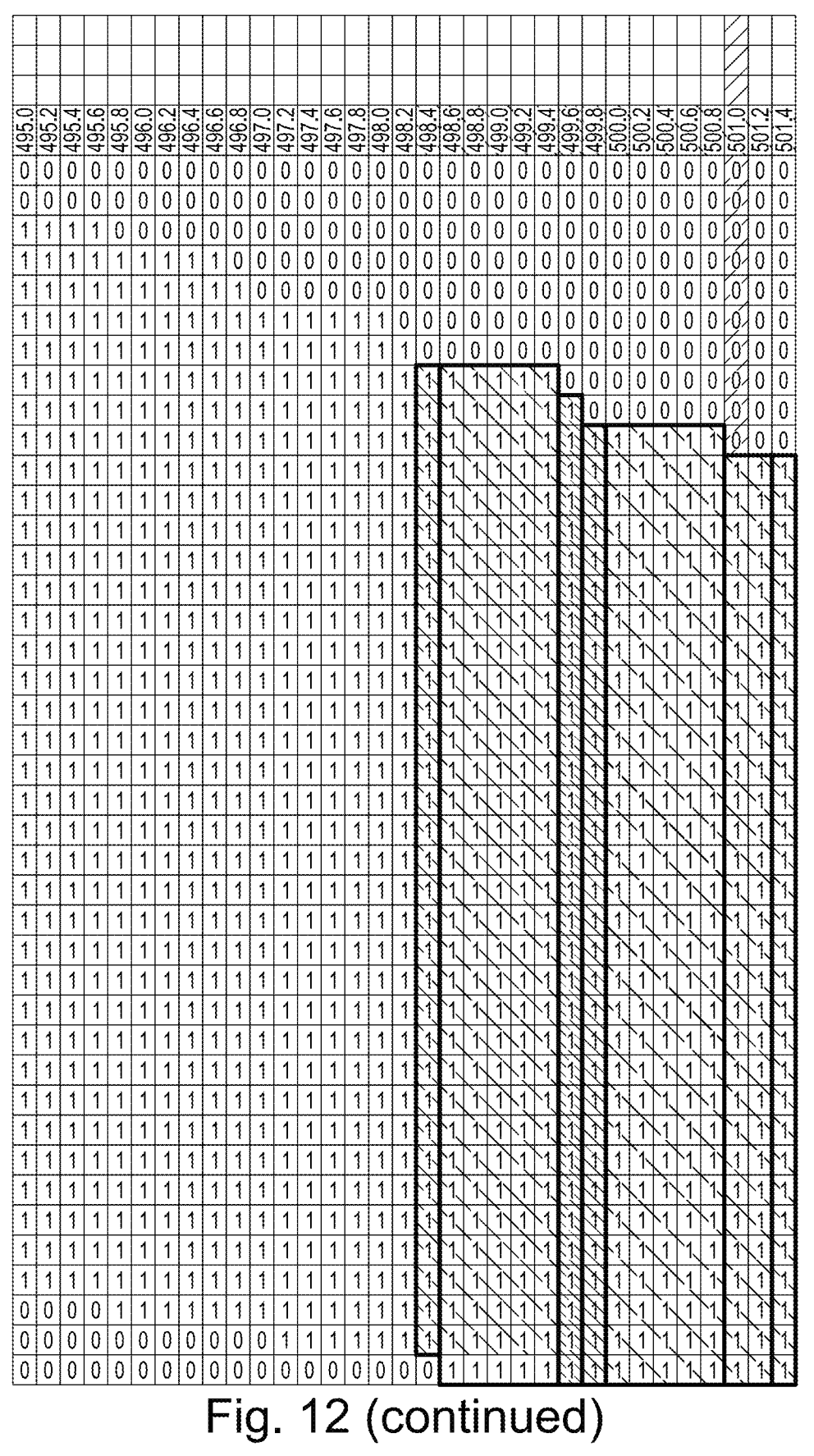

It is seen from the table in FIG. 12 that the typical m/z range that would lead to the same fingerprint in this example is at most 0.8 Da, and can be as low as 0.4 Da. This suggests that the fingerprint has the potential to distinguish precursors, or determine m/z values of precursors with a precision of about 1 Da, and theoretically even below.

This also demonstrates that the specific data acquisition in the MIDIA frames as described herein does indeed increase the information encoded therein significantly over that encoded in the nonoverlapping vertical prior art PASEF frames, which is why the name "maximum information data independent acquisition" was chosen. Precisely how the information is then derived from the data depends inter alia on the question at hand, and is not limiting for the present invention. In some cases, one would observe specific fragments in a number of measurements and would simply wish to know a likely m/z value of a possible precursor. In other embodiments, one may know a possible precursor, for example from MS1 measurements carried out intermittently with the MS/MS measurements, together with its variance in ion mobility, and could then wish to determine the likelihood that a certain fragment is associated with this specific precursor, for example to generate weighted precursor-fragment ion relationships which could be used as inputs for database search engines or for the interrogation of spectral libraries to identify analytes of interest (e.g. peptides, lipids, metabolites or other small molecules in the mass range between 50 and 5000 Da).

The skilled person will hence appreciate that there are many possible ways to exploit the information included in the IM-dependent TOF measurements obtained with the overlapping MIDIA frames for the purpose of associating fragments with their precursor, and the invention is not limited to any specific one of them. Indeed, various data evaluation methods will lead to excellent results, as they all benefit from the fact that the occurrence of a given fragment (either as a binary event or in terms of an intensity) in various MIDIA subframes associated with different MIDIA scans encodes highly specific information with regard to the corresponding precursor ion. As such, all of these variants rely on "determining or utilizing the corresponding mass windows and IM ranges associated with various occurrences of a given fragment in the mass spectrometry measurement".

While it is hence to be understood that the invention is not limited to any specific data evaluation procedure, a few examples shall be outlined in the following.

In a preferred embodiment, MS1 data, i.e. data for the un-fragmented precursor ions is measured using IMS/MS. The measurement data can be organized in four-dimensional tuples (RT, IMI, m/z, intensity), where RT is the retention time and IMI is again the ion mobility index. The intensity may be an absolute or relative intensity. The tuples are referred to as MS1-(4D-tuple) in the following. Accordingly, these MS1-(4D-tuples) define for each precursor, which is characterized by its m/z value, an intensity as a function of RT and IMI.

The MS2 data of fragment ions are collected using overlapping MIDIA frames. This leads to 5-dimensional tuples (RT, m/z, MIDIA scan #, IMI, intensity), which are referred to as MIDIA-(5D-tuples) herein, wherein "MIDIA scan #" designates the number of the MIDIA scan in a given MIDIA cycle. Note that the corresponding mass window of the mass filter is defined by the MIDIA scan # and the IMI, together with the measurement protocol which defines the synchronization of the IMS device and the mass filter (in the shown embodiment, quadrupole) for each individual MIDIA scan.

In addition or alternatively, the exact position of the mass window of the mass filter as a function of MIDIA scan # and IMI and can be obtained by a "pseudo-MS2" measurement, which is carried out in the same way as the true MS2 measurement, except that the precursor ions are not fragmented. These pseudo-MS2 measurements can be carried out separately or parallel with the true MS2 measurements. For example, between each two MIDIA scans or MIDIA cycles of the true MS2 measurement, a pseudo-MS2 MIDIA scan or cycle can be interspersed, which would be an example of a parallel acquisition of the pseudo-MS2 data. From these pseudo-MS2 data, the precise location of the mass window can be reconstructed.

Moreover, since the pseudo-MS2 data conserves the m/z value of the precursors, it is straightforward to associate the same ions in the MS1 and pseudo-MS2 datasets. Accordingly, the pseudo-MS2 data can be used as ground truth data for any type of algorithm or model that predicts or calculates, based on the representation of a precursor in the MS1-(4D-tuple) space, an intensity distribution with respect to IMI and MIDIA scan # that is to be expected in the corresponding fragment ions in the MIDIA-(5D-tuples) of the MS2 data. For the prediction or calculation of the expected distributions, various algorithms and models can be used, such as matrix-based methods, neural networks, random forests, support vector machines or other methods of machine learning. This way, once such algorithm or model is established, MS1 data present in the four-dimensional MS1-(4D-tuple) space can be transformed into corresponding five-dimensional data in the MIDIA-(5D-tuple) space, which can be compared, matched or correlated with MS2 data of the fragments to thereby associate a given fragment with its precursor, without having to constantly carry out pseudo-MS2 measurements. Obviously, this transformation does not relate to the m/z value contained MIDIA-(5D-tuple), since the m/z of the fragment cannot be derived from the MS1 data.

In the alternative, the pseudo-MS2 data can also be used to derive algorithms and models that allow for calculating or predicting, based on the MIDIA-(5D-tuples) (i.e. RT, m/z, MIDIA scan #, IMI, intensity) associated with a given fragment, an intensity distribution as a function of RT, IMI, and (possible) m/z for the corresponding precursor ion. These algorithms or models may likewise be based on matrix-based methods, neural networks, random forests, support vector machines or other methods of machine learning. This way, once such algorithm or model is established, MS2 data present in the five-dimensional MIDIA-(5D-tuple) space can be transformed into corresponding four-dimensional data in the MS1-(4D-tuple) space, and can be compared, matched or correlated with MS1 data of tentative precursors, to thereby associate a given fragment with its precursor, without having to constantly carry out pseudo-MS2 measurements.

More precisely, in one embodiment, the matching or association of precursor ions (MS1) and fragment ions (true MS2) can be carried out for example by a scoring function based on (i) a predicted or simulated MIDIA-(5D-tuple) fragment intensity distribution, which is derived from the MS1-(4D-tuple) intensity distribution of a tentative precursor ion using one of the algorithms and models described above, and (ii) the MIDIA-(5D-tuple) intensity distribution of a given fragment ion obtained in the MS2 measurement.

As indicated before, in this scoring, the m/z value of the measured and predicted MIDIA-(5D-tuples) is not taken into account, since the predicted MIDIA-(5D-tuples) derived from MS1 measurements do not contain m/z information with regard to possible fragments.

Instead, the starting point of this matching would be a given fragment, having a certain m/z value, and the matching concentrates on a similarity or agreement in the other four dimensions of the predicted or simulated MIDIA-(5D-tuple) with the corresponding measured MIDIA-(5D-tuples) for this fragment.

Note that the MIDIA scan #, IMI, and intensity value of all of the MIDIA-(5D-tuples), in which the m/z value corresponds to the m/z of a given fragment, represent what was more generally referred to as the "mass windows and IM ranges associated with various occurrences of said fragment in the mass spectroscopy measurement" above. In the specific embodiment at hand, the "mass window" is parameterized by the MIDIA scan # and the IMI, the "IM range" is represented by the IMI, and the "various occurrences of the fragment" correspond to the subset of MIDIA-(5D-tuples) for which the m/z value matches that of the fragment, where the corresponding intensity value adds a quantitative measure to the "occurrence". Moreover, selecting the MIDIA-(5D-tuple) intensity distribution for a given fragment ion, for example by selecting all MIDIA-(5D-tuples) having the fragment m/z value, can be regarded as an example of "determining the corresponding mass windows and IM ranges associated with various occurrences of the fragment in the MS2 measurement".

In another embodiment, the matching or association of precursor ions (MS1) and fragment ions (MS2) can be carried out by a scoring function based on
(i) The MIDIA-(5D-tuple) intensity distribution of tentative precursor ions that are obtained by the pseudo-MS2 data collected in parallel with the true MS2 data, and
(ii) The MIDIA-(5D-tuple) intensity distribution of a given fragment as obtained in the true MS2 measurement.

Herein again, selecting the MIDIA-(5D-tuple) intensity distribution with respect to a specific fragment for consideration in the scoring is a special example of the aforementioned "determining the corresponding mass windows and IM ranges associated with various occurrences of said fragment".

In a yet further embodiment, the matching or association of precursor ions (MS1) and fragment ions (MS2) can be carried out for example by a scoring function based on (i) an RT, IMI, and intensity distribution of a corresponding precursor ion that is predicted from the MIDIA-(5D-tuple) intensity distribution of the respective fragment,
(ii) the m/z range of the precursor ions predicted from the MIDIA-(5D-tuple) intensity distribution of the respective fragment, and
(iii) the measured MS1-(4D-tuple) intensity distribution.

The scoring functions employed in the above examples can be a correlation, or can likewise be carried out using a matrix-based prediction model, a neural network, random forests, support vector machines or other machine learning methods. The above embodiments were based on scenarios in which MS1 data is available, and hence all the possible precursor ions are known. However, this is not always necessary, since it is possible to reconstruct, from the MIDIA-(5D-tuple) intensity distribution of the respective fragment alone, the IMI, RT and m/z of a possible precursor ion, using suitable algorithms of the type outlined above. For this purpose, it is preferable that in a first step, all of the fragments are identified that are (presumably) associated with the same precursor. Note that fragments that originate from the same precursor can be identified by their highly correlated distributions in the MIDIA-(5D-tuple) space in all dimensions other than the m/z value. Then, based on the MIDIA-(5D-tuple) intensity distributions of the respective fragments, the IMI, RT and m/z of a possible precursor ion can be determined, which can in turn be used for a database search or a comparison with a spectral library.

Figure 13:
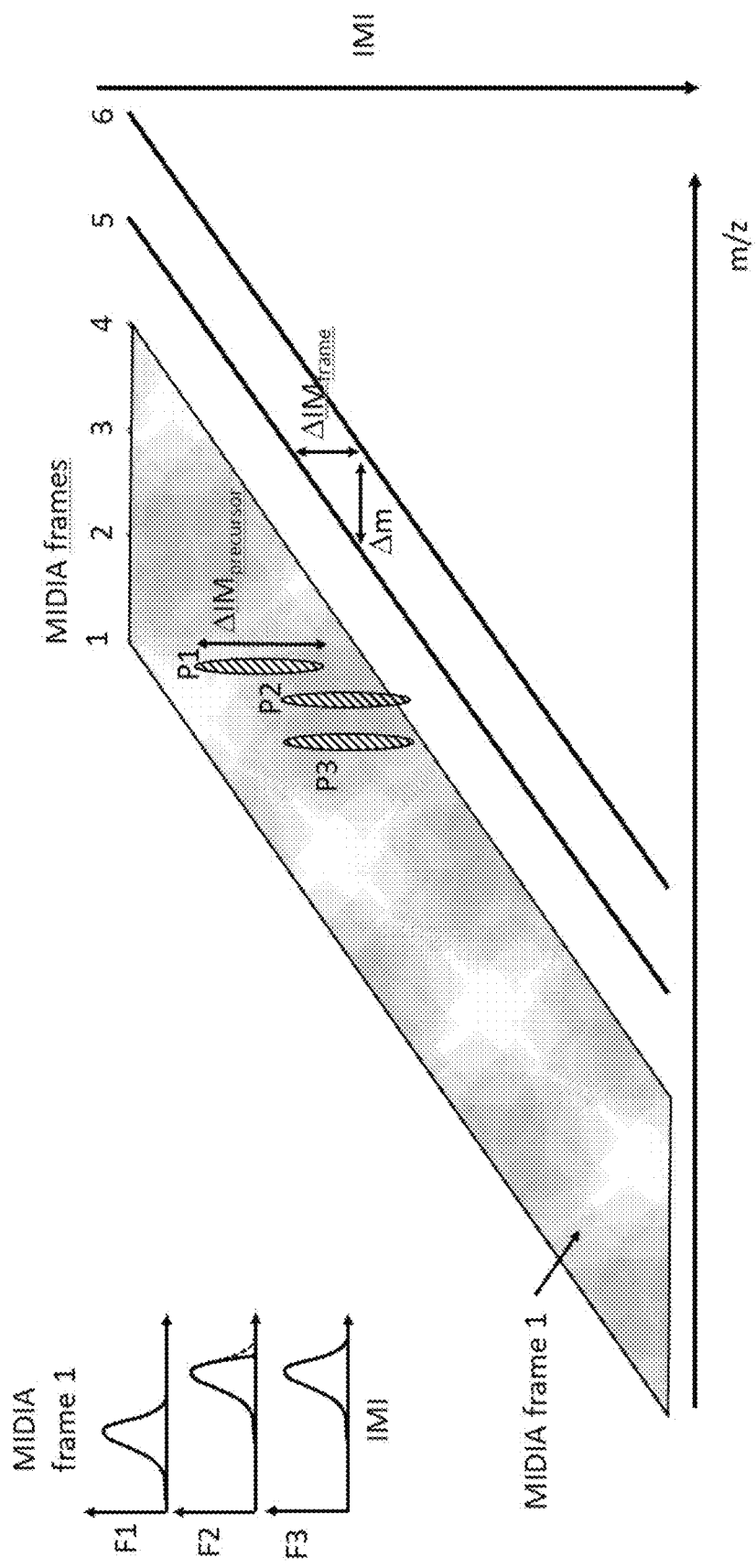
FIG. 13-16 show a sequence of MIDIA frames and the corresponding intensity as a function of IMI for the fragments of three precursors covered thereby.

Next, with reference to FIGS. 13 to 19, another illustrative embodiment will be described, which further illustrates how and why the use of MIDIA scans and frames allows for very precisely associating a fragment with its precursor. FIG. 13 shows three precursors P1, P2 and P3 located in the m/z-IM plane, as well as the location of a first MIDIA scan in a MIDIA cycle of a true MS2 measurement. The precursors P1, P2 and P3 are again seen to have an elongate shape in the IM direction, meaning that each precursor is associated with a range of IMI, that is associated with the inverse rate of TIMS pulses, and that has an extension indicated as $\Delta IM_{precursor}$ in FIG. 13. As was explained above, the reason for this extension or "spread" $\Delta IM_{precursor}$ of the precursors in the IM direction is that each IMI is associated with one TOF push, and the frequency of TOF pushes is higher than the rate of TIMS pulses at which the precursor ions are released from the TIMS. Moreover, it is seen that the location of the IM ranges associated with precursors P2 and P3 is identical, which makes the correct attribution of the respective fragments with prior art methods particularly difficult.

In the MS2 measurement, five-dimensional data (RT, m/z, MIDIA scan #, IMI, intensity) is acquired, which is organized in the aforementioned MIDIA-(5D-tuples). For illustration purpose, three fragments F1, F2 and F3 shall be considered, which originate from the precursors P1, P2, and P3, respectively. In practice, the task is then to identify for each of the fragments Fn (with n an integer number) its corresponding precursor. For this purpose, one may in a first step look at the distribution of the intensity of a given fragment Fn, defined by its m/z value, as a function of the IMI, for the given first MIDIA scan (i.e. MIDIA scan #=1). This is shown for the three fragments F1, F2 and F3 in FIG. 13. While the IMI is actually a discrete variable, it is shown as a continuous variable for simplicity in the figures. It is seen from the diagram how the intensity peak first occurs for the first fragment F1 during a lower range of IMI values, while it simultaneously occurs for identical IMI value ranges for F2 and F3. The simultaneous occurrence of the intensity for identical IMI value ranges for F2 and F3 suggests that it could be difficult to correctly assign their respective precursor ions. However, it is seen that the lower end of the precursor P2 in the m/z-IM diagram is not covered by the first MIDIA frame, such that the intensity-IMI diagrams for F2 and F3 are not quite the same after all. Instead, for fragment F2, the intensity is "cut off" for the highest IMI values, because for these highest IMI values, the corresponding precursor P2 falls out of the mass window of the mass filter (quadrupole). The diagram for F2 shows the intensity-IMI diagram actually obtained in solid line, while the dashed line indicates how the curve would have looked like without the cut-off by the mass window. Without the "cut off", the intensity-IMI diagrams for the fragments F2 and F3 would indeed not be distinguishable from each other.

Figure 14:
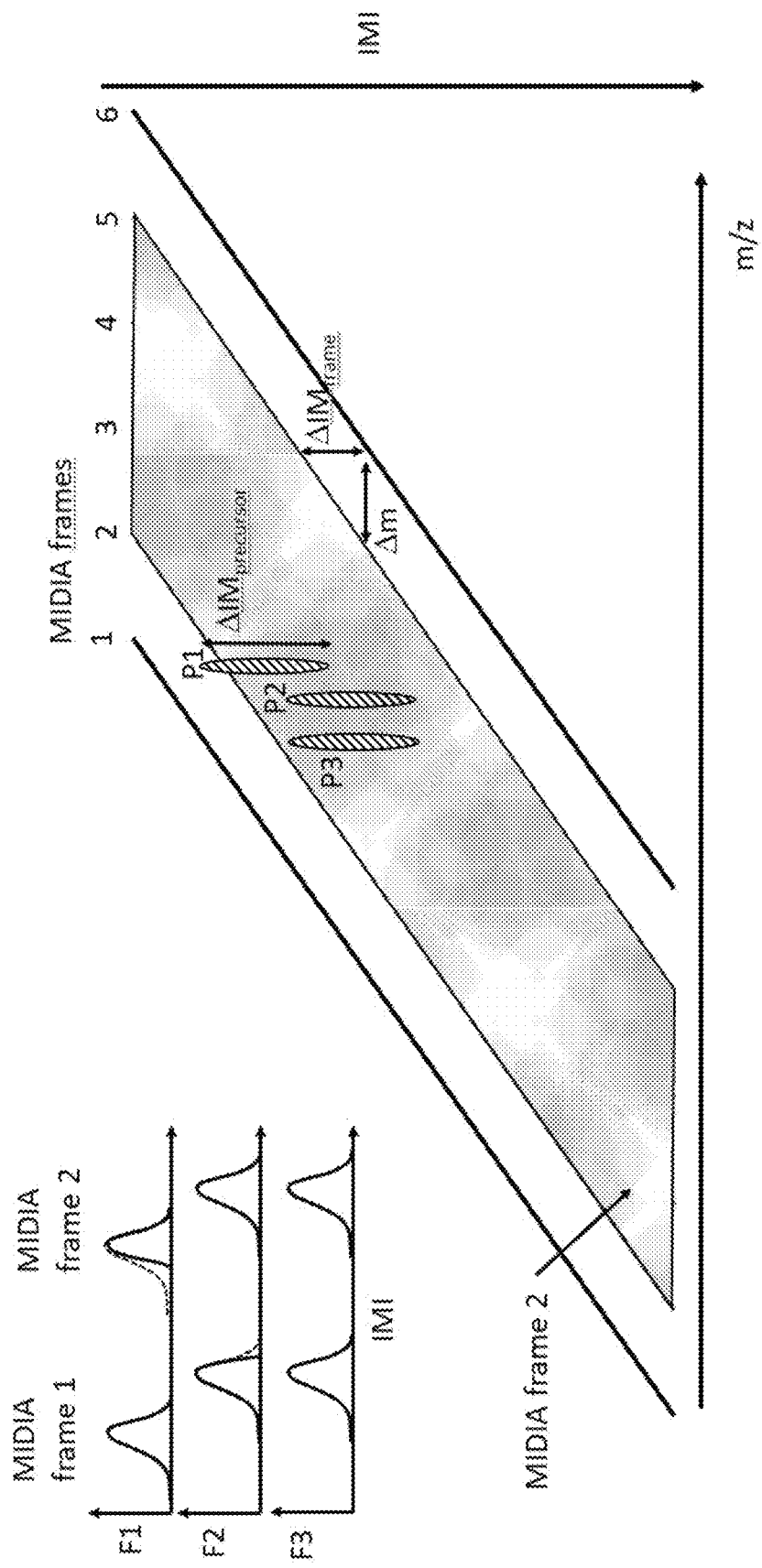

FIG. 14 shows the same situation for the second MIDIA scan (i.e. MIDIA scan #=2). As is seen in FIG. 14, the second MIDIA frame corresponds to a shifted copy of the first MIDIA frame, which is shifted in the m/z direction by a distance $\Delta_m$ which corresponds to $\frac{1}{3}$ of the frame width. Along with this shift by $\Delta_m$ in m/z direction comes vertical offset $\Delta IM_{frame}$ between the edges of adjacent MIDIA frames for identical m/z, which is also indicated in FIG. 14.

Also shown in FIG. 14 are the added intensity-IMI diagrams for fragments F1, F2 and F3 for the second MIDIA frame. It is seen that in this case, the second MIDIA frame cuts off the upper end of precursor P1, which is reflected in the corresponding intensity-IMI diagram of fragment F1.

Figure 15:
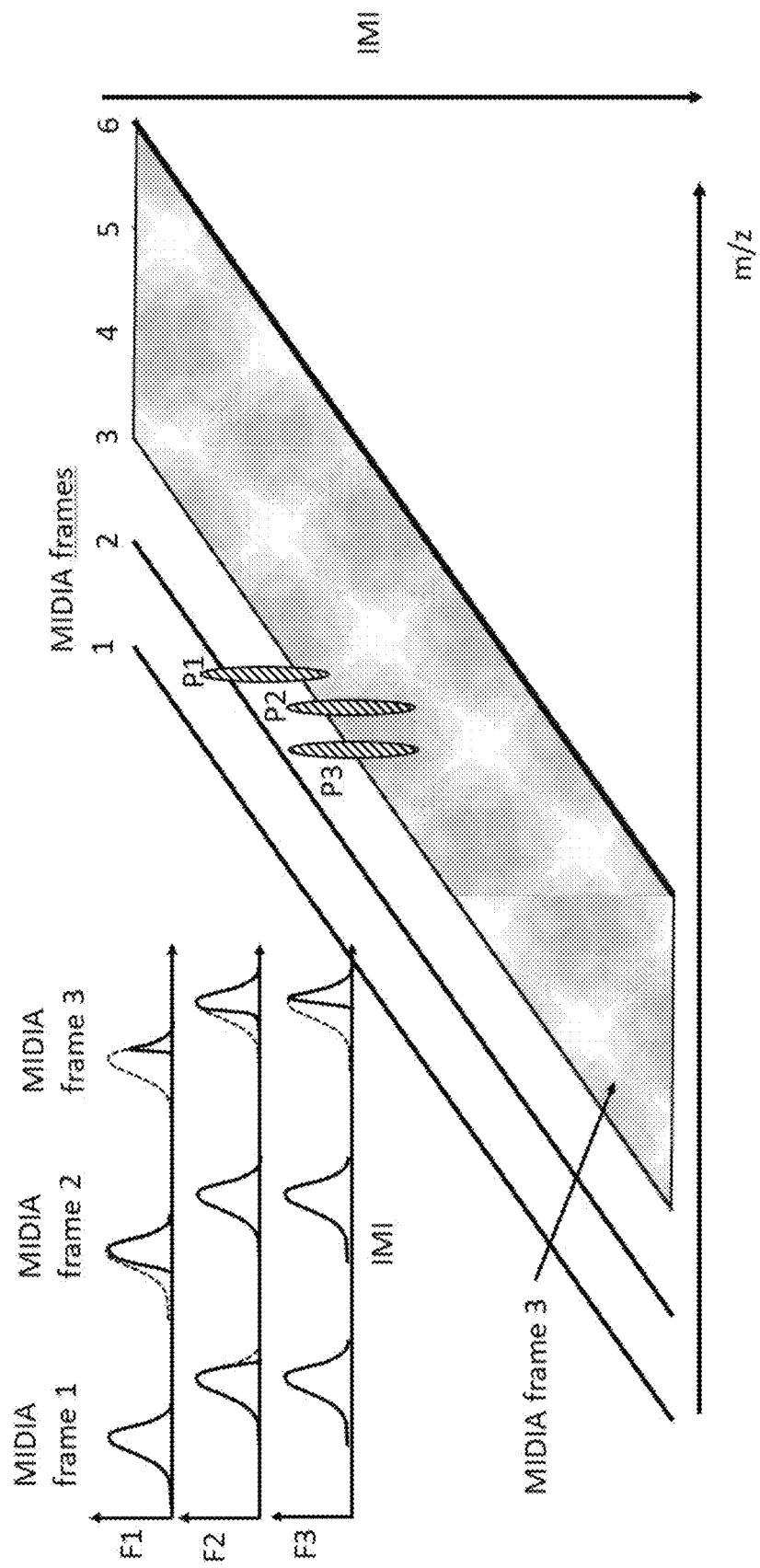

FIG. 15 shows the same situation for the third MIDIA scan (i.e. MIDIA scan #=3). As is seen in FIG. 15, the third MIDIA frame corresponds to a shifted copy of the first MIDIA frame, which is shifted by $\frac{2}{3}$ of its width towards higher m/z values. Also shown in FIG. 15 are the accumulated intensity-IMI diagrams for fragments F1, F2 and F3 up to the third MIDIA frame. It is seen that in this case, the third MIDIA frame cuts off the upper portions of each of the precursors P1, P2 and P3, but the sizes of these cut-off portions are different from each other, leading to the characteristic intensity-IMI diagrams of the corresponding fragments F1 to F3 shown in FIG. 15.

Figure 16:
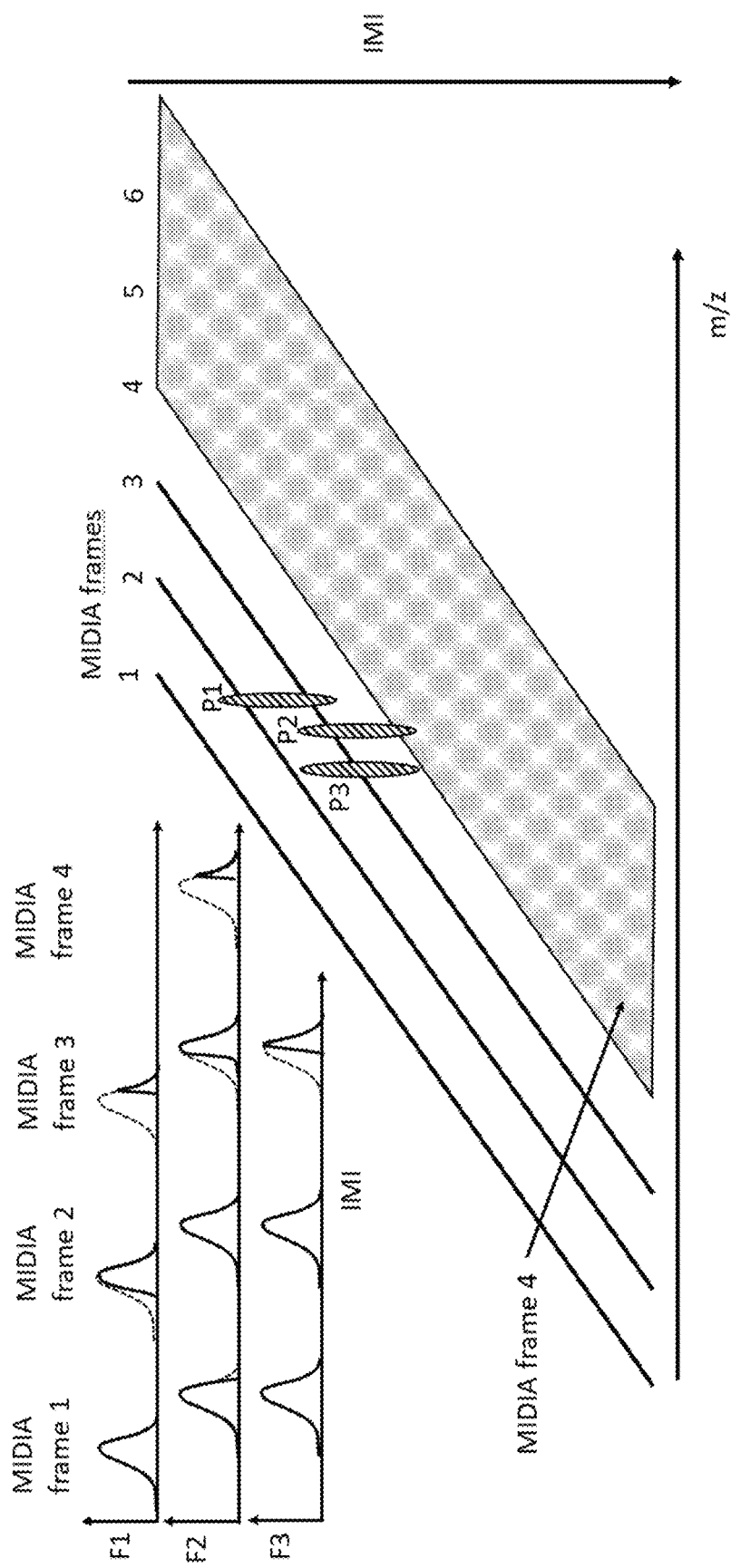

Finally, FIG. 16 shows the same situation for the fourth MIDIA scan (i.e. MIDIA scan #=4). Herein, the fourth MIDIA frame is shifted with respect to the first MIDIA frame by one full frame width. Precursors P1 and P3 are no longer covered by this fourth MIDIA frame, but the lower end of precursor P2 is still captured, which is reflected in the intensity-IMI diagram of the corresponding fragment F2.

The "cut-offs" in the intensity-IMI diagrams of the fragments are very characteristic and encode information allowing for correctly associating each of the fragments Fn with their corresponding precursor Pn, for example by determining correlations, as will be described next. In the embodiment shown, the size $\Delta IM_{precursor}$ of the IM range covered by each precursor ion Pn is larger than the vertical offset $\Delta IM_{frame}$, which guarantees that for each of the precursors, there will be at least one such cut-off. In the example schematically illustrated in FIGS. 13 to 16, precursors P1 and P2 indeed have two such cut-offs, while P3 has only one.

Figure 17:
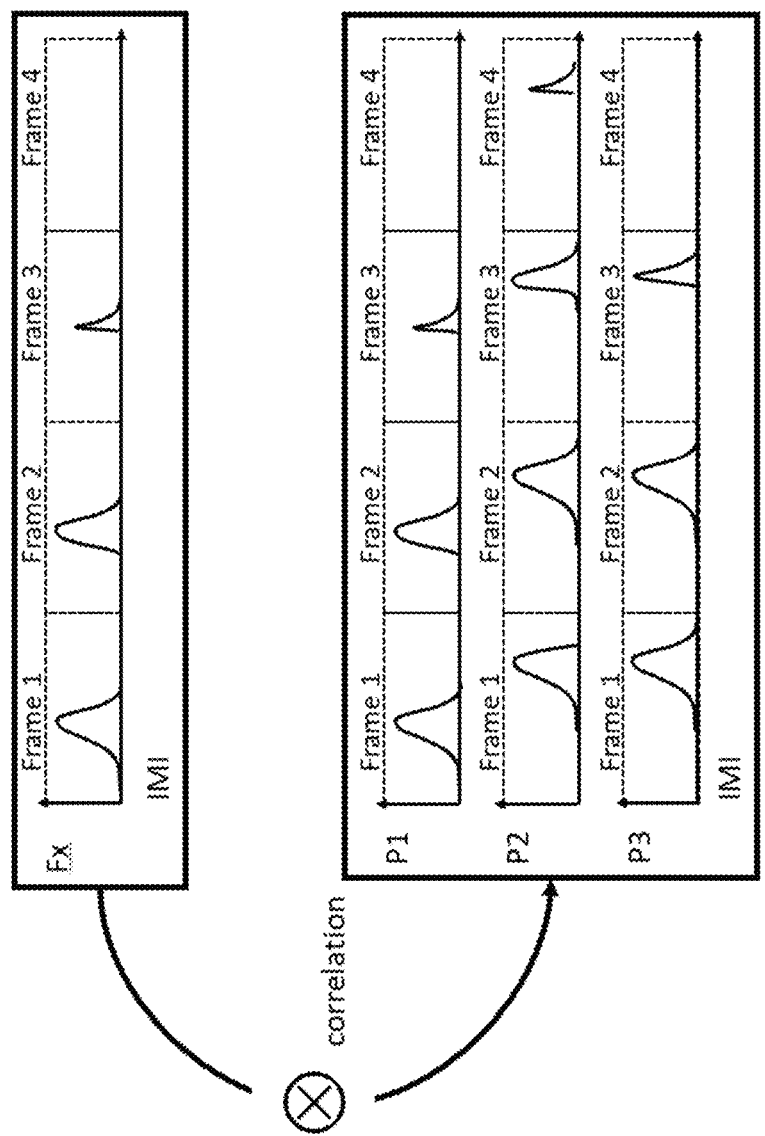
FIG. 17 is a schematic diagram illustrating the step of associating a fragment with its corresponding precursor based on a correlation of the intensity-IMI relationships for a plurality of overlapping MIDIA frames.

FIG. 17 schematically illustrates how a fragment Fx can be associated with a corresponding one of the possible precursors, wherein in the illustrative example, only three precursors P1 to P3 are available, and only four MIDIA frames are considered for simplicity. The corresponding precursor is identified by calculating a correlation between the intensity-IMI diagrams of all four MIDIA frames of a given fragment Fx with corresponding intensity-IMI diagrams of all available precursors, in this simple case precursors P1, P2 and P3. As was explained above, these intensity-IMI diagrams can be directly obtained by pseudo-MS2 measurements, which generate data organized in the same type of MIDIA-(5D-tuples) as the true MS2. This allows for calculating the correlation in a straightforward manner.

In the alternative, intensity-IMI diagrams for "virtual MIDIA scans" for the precursor ions P1 to P3 can be artificially generated based on MS1 data only, for example using one of the algorithms for this purpose described above. Herein, the term "virtual MIDIA scan" indicates that in this case, the MS1 data was not generated using actual MIDIA scans, but the data is derived such as to predict how the data would have looked at, if pseudo-MS2 data had been obtained.

Irrespectively of precisely how the intensity-IMI distributions or waveforms for the precursors are obtained for all four (true or virtual) MIDIA frames, it is immediately seen from FIG. 17 that the correlation of the data for Fx with that of P1 is the highest, such that fragment Fx can be identified to be fragment F1.

Figure 18:
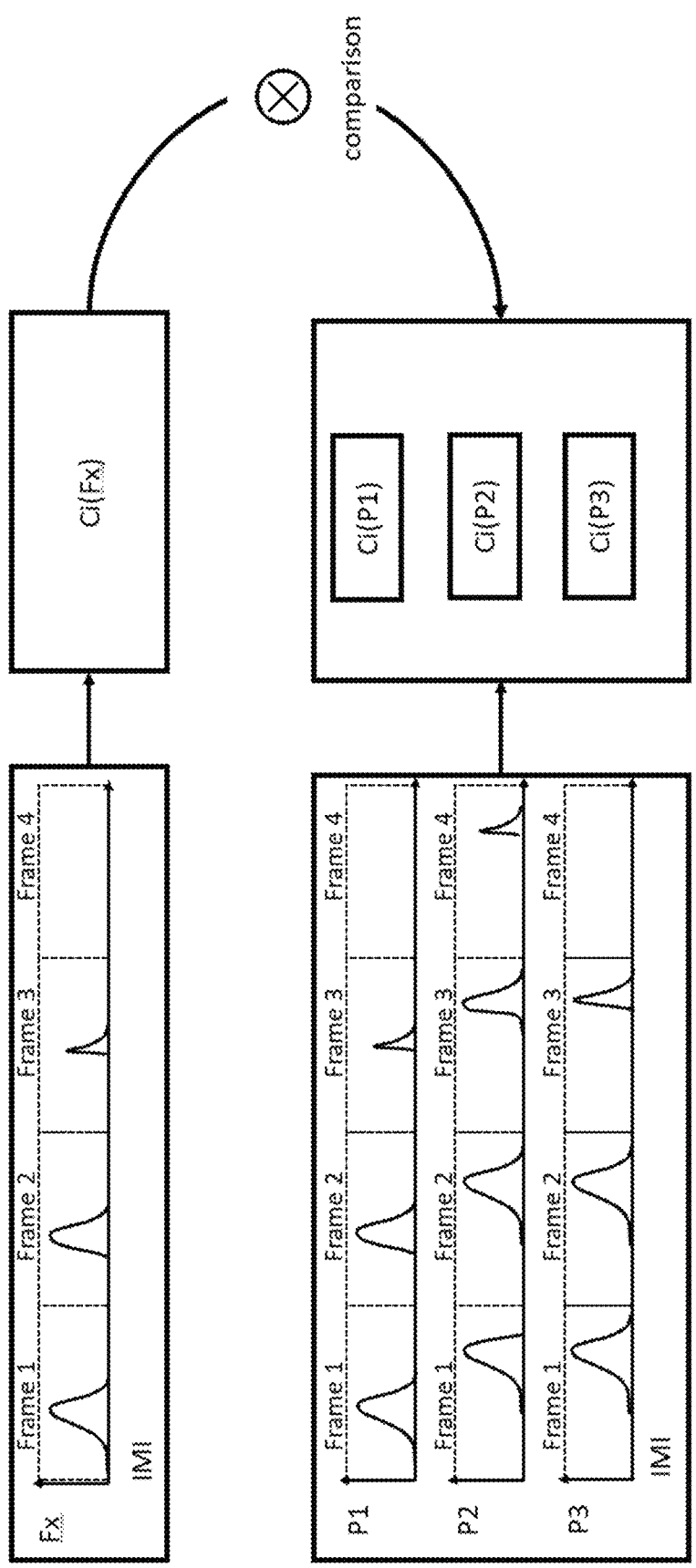
FIG. 18 is a schematic diagram illustrating the step of associating a fragment with its corresponding precursor based on a comparison of coefficients of a transformation of intensity-IMI relationships for a plurality of overlapping MIDIA frames.

Instead of calculating a correlation, the matching between the fragment and precursor data can of course be done in various other ways. For example, as shown in FIG. 18, the measured intensity-IMI distributions for the set of MIDIA frames associated with a fragment Fx can be subjected to a transformation, for example a wavelet transformation, leading to a set of transformation coefficients Ci(Fx). Similar transformations can be applied to each of the precursors Pn, leading to corresponding sets of transformation coefficients Ci(Pn) for n=1, ..., 3. The set of transformation coefficients Ci(Fx) can then be compared with the sets of transformation coefficients Ci(Pn) of the respective precursors Pn, and the precursor having the best match in the coefficients (in this case, P1) will be associated with the fragment Fx.

Note that establishing the intensity-IMI diagrams for various MIDIA scans from the MS2 data is again an example of "determining the corresponding mass windows and IM ranges associated with various occurrences of said fragment in said mass spectrometry measurement", since every non-vanishing intensity represents an "occurrence", and the MIDIA scan # and the IMI together define a mass window associated with the mass filter.

Figure 19:
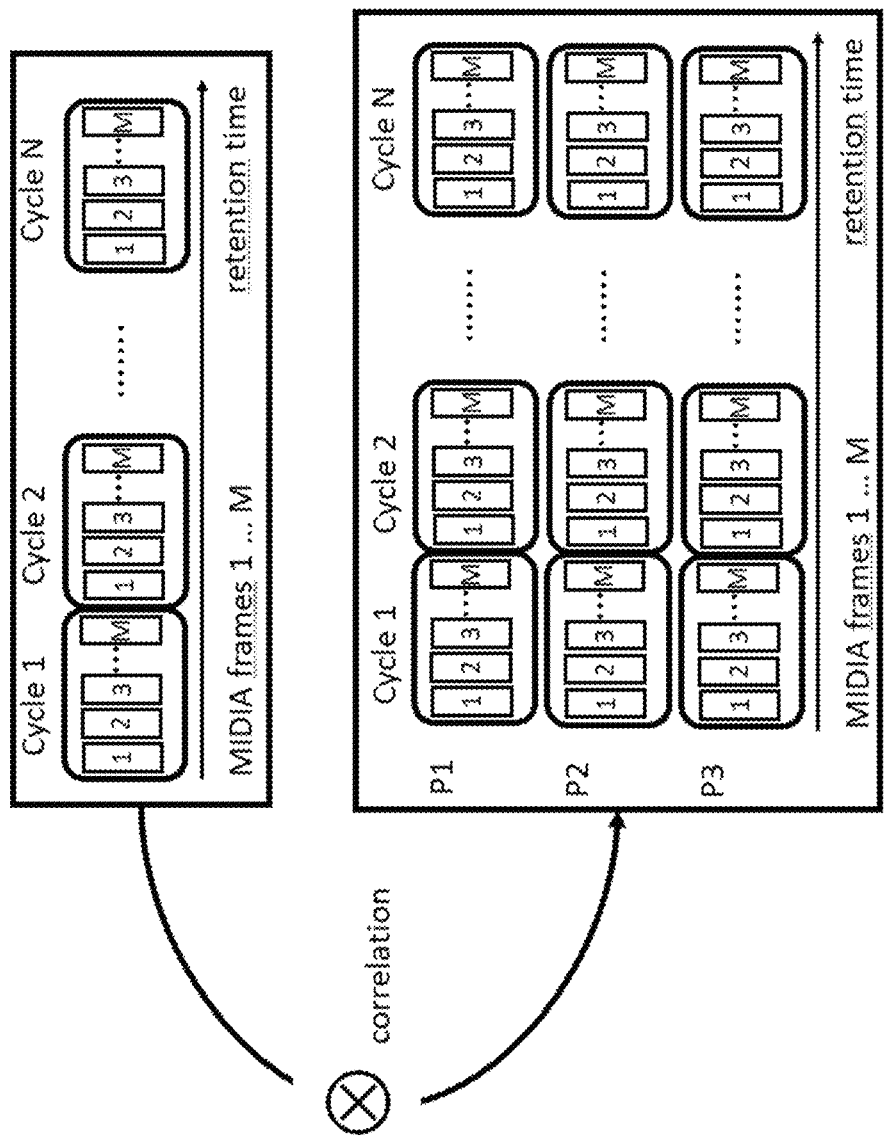
FIG. 19 is a schematic diagram illustrating the step of associating a fragment with its corresponding precursor based on a correlation calculated between data associated with multiple MIDIA cycles, each MIDIA cycle comprising a plurality of MIDIA scans, where the multiple MIDIA cycles cover a corresponding retention time range associated with a liquid chromatography peak.

In the discussion of FIGS. 13 to 18, only a single MIDIA cycle comprising four MIDIA frames has been discussed, while the RT dimension has so far been neglected, for keeping the discussion simple and focused. In practical applications, of course, the RT dimension will likewise be accounted for. For example, as shown in FIG. 19, the correlation can be calculated between data associated with multiple MIDIA cycles, each MIDIA cycle comprising a plurality of MIDIA scans or frames, where the multiple MIDIA cycles cover one LC peak, i.e. an RT range.

Current investigations by the inventor found that the MIDIA acquisition does not only allow for a much higher specificity with regard to the precursor mass, but also compares favourably with regard to sensitivity and speed over the diaPASEF as currently known from prior art. In the best mode of diaPASEF currently known, the total cycle time is currently 1.7 seconds.

In comparison, in one embodiment of the invention, one may use 20 MIDIA scans, each conducted in 50 ms and constituted of 36-Da-wide mass windows, and with adjacent MIDIA frames overlapping by $\frac{2}{3}$ in m/z direction. In this embodiment, the cycle time is hence reduced to 1.1 seconds (including MS 1 scan and internal instrument "overhead"), and it is found that the sensitivity increases by approximately 50%. Moreover, the specificity increases at least by 100%, namely to 12 Da instead of 25 Da under the rationale of FIG. 7, but using the fingerprint as explained with reference to FIGS. 11 and 12 above, the specificity can be raised much higher than this.

In another embodiment, a high-resolution measurement can be carried out, which does not improve the speed over diaPASEF, but which allows to further increase the specificity. In this embodiment, the mass windows are chosen to be only 24 Da wide. In this embodiment, 32 MIDIA frames are used, again overlapping by ⅔ in m/z direction, and with again 50 ms devoted to each MIDIA scan. In this case, the specificity reaches at least to 8 Da, even without using the additional information encoded in the fingerprint as explained with reference to FIGS. 11 and 12 above.

If high-speed is an issue, in a yet further embodiment, the individual MIDIA scans are carried out in only 25 ms each, with mass window sizes of 36 Da and an overlap of ⅔. The sensitivity is again approximately 50% higher than in case of diaPASEF, while the cycle time reduces to 0.6 seconds, and hence to about ⅓ of that of diaPASEF.

Figure 20:
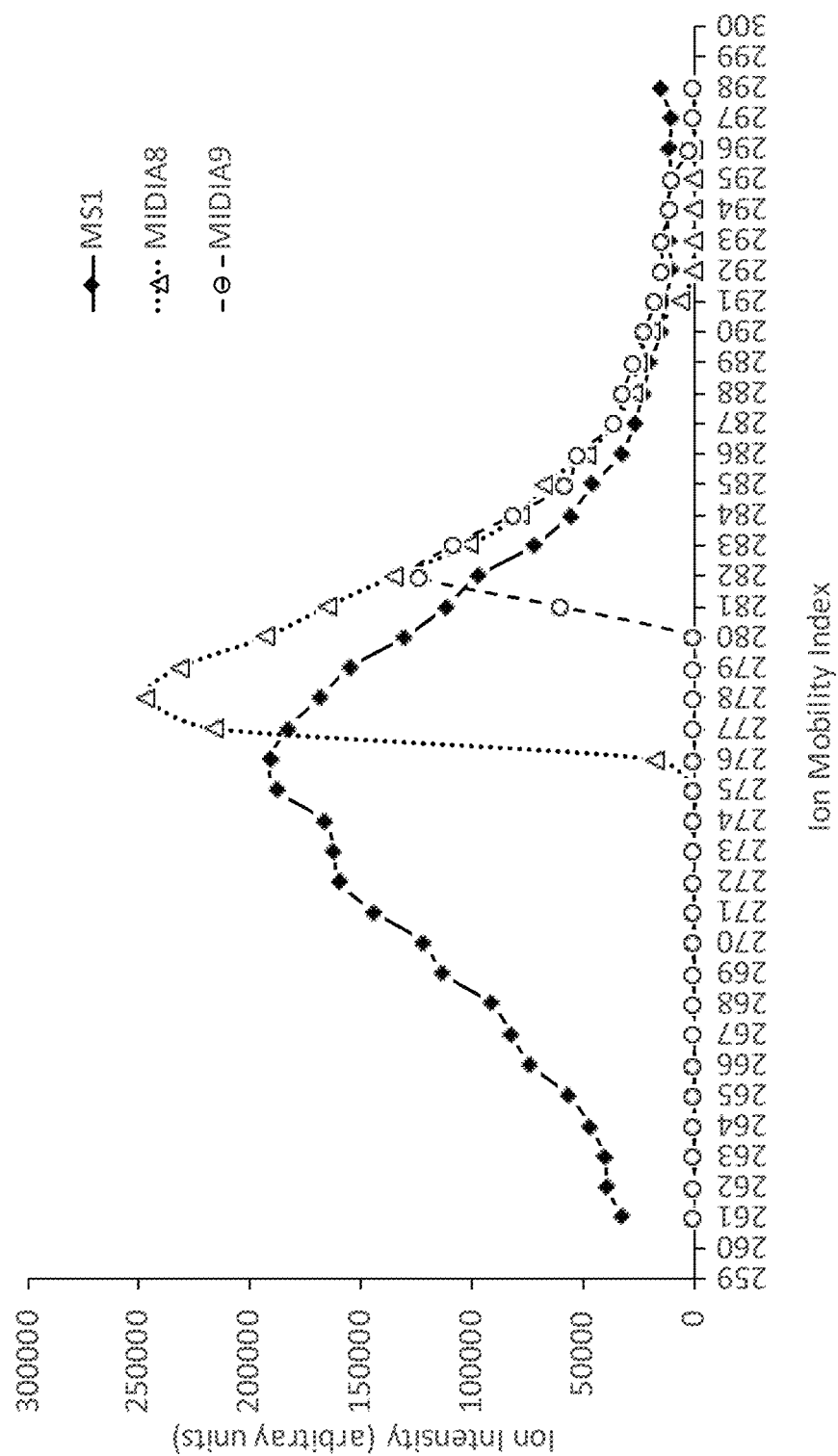
FIG. 20 shows the intensity as a function of ion mobility index (IMI) for a known precursor obtained in an MS1 measurement and in exemplary eighth and ninth MIDIA frames, respectively.

FIG. 20 shows exemplary measurements according to embodiments of the invention. In FIG. 20, the diamonds connected by the dashed line represent an intensity of a precursor ion having an m/z value 550.3 as a function of ion mobility obtained in an MS1 measurement. It is seen that for this precursor ion, the intensity is distributed according to a bell-shaped distribution over a range of IMI values, as was explained before.

A MIDIA procedure has been carried out for this precursor ion, where in each MIDIA frame, the mass window of the mass filter was adjusted as a function of IMI, but without fragmenting the precursor ion afterwards. The triangular symbols connected by the dotted line show the intensity of the precursor after passing the mass filter in the eighth MIDIA frame. The purpose of this measurement was again to confirm the high precision of determining the m/z value of precursors using the information contained in the measurement according to the MIDIA frames.

FIG. 21 shows a table summarizing how the position of the mass window in the eighth MIDIA frame varies as a function of IMI. More precisely, the second and third columns of the table of FIG. 21 show the left and right edges of the mass window for a given IMI-value. The fourth to fourteenth columns summarize the transmission coefficients for m/z values between 548.5 and 553.5 m/z. In an idealistic, simplified view, one would expect the transmission coefficients to switch between 0% and 100% at the left and right edges of the mass window, but in practice, there is of course a gradual change in quadruple transmission efficiency across several IMI values. For example, for the IMI value of 277, where the left edge of the mass window is at 548.5, it is seen that the transmission co-efficient for a precursor having m/z of 548.5 is 60%, gradually increasing for larger m/z values, and reaching the maximum only at 551.5 m/z. Moreover, the maximum transmission coefficient in this case is 120%, rather than 100% as one would expect, because the percentage is in expressed in comparison with the transmission obtained for the precursor when the mass selection of the mass filter is turned off. As the skilled person will appreciate, when the mass selection is "switched off", the transmission is somewhat lower than when the selection is on and a precursor falls right into the middle of the mass window. This is also the reason why the maximum intensity associated with the eighth MIDIA frame (i. e. triangles) in FIG. 20 exceeds the intensity of the precursor without mass selection by the mass filter (i. e. diamonds).

From the table of FIG. 21, it is seen that the transmission coefficient for the precursor ion having an m/z of 550.3 should be 0 for all IMI of 275 and lower, which is precisely the behavior seen in FIG. 20. At an IMI value of 276, the transmission coefficient according to the table of FIG. 21 should be somewhere between 14% and 32%, which is in good agreement with the data of FIG. 20. At an IMI of 278, the transmission coefficients in the m/z range between 550 and 550.5 reaches the maximum value of 120%, and this too is seen in FIG. 20.

The full transmission coefficient of 120% is maintained up to an IMI of 289, where it begins to drop, and it reaches zero at an IMI of 293 and higher, which is likewise seen in FIG. 20.

From the IMI-dependent transmission coefficients associated with each MIDIA frame and the measured intensity, the mass of the precursor ion can be determined with very high precision. Indeed, by matching the intensity as obtained in the eighth MIDIA frame (triangles in FIG. 20) with the transmission coefficients of FIG. 21, it can be predicted that the m/z must be in a range of between 550 and 550.5.

Additional information can be obtained from further MIDIA frames. For example, in FIG. 20, the circles connected by dashed lines represent the intensity obtained in the ninth MIDIA frame. The transmission coefficients of the mass filter as a function of IMI for the ninth MIDIA frame is summarized in the table of FIG. 22. It is seen from FIG. 20 with the bare eye that the transmission coefficient is still zero or close to zero at IMI 280 and rises to 120% during the consecutive IMI values 281 and 282, where the transmission coefficient at the intermediate IMI value 281 is a little lower than 60%. It can therefore again be discerned that the m/z of the precursor ion must be between 550 and 550.5.

Since each fragment ion can be detected in several MIDIA frames (in the embodiment shown, at least in three MIDIA frames, but depending on the spread of the precursor ion in IMI direction, often considerably more), the cumulative information from the transmission patterns associated with various MIDIA frames allow for a very precise estimation of the precursor m/z, typically with a precision of +/−1 m/z.

Figure 23:
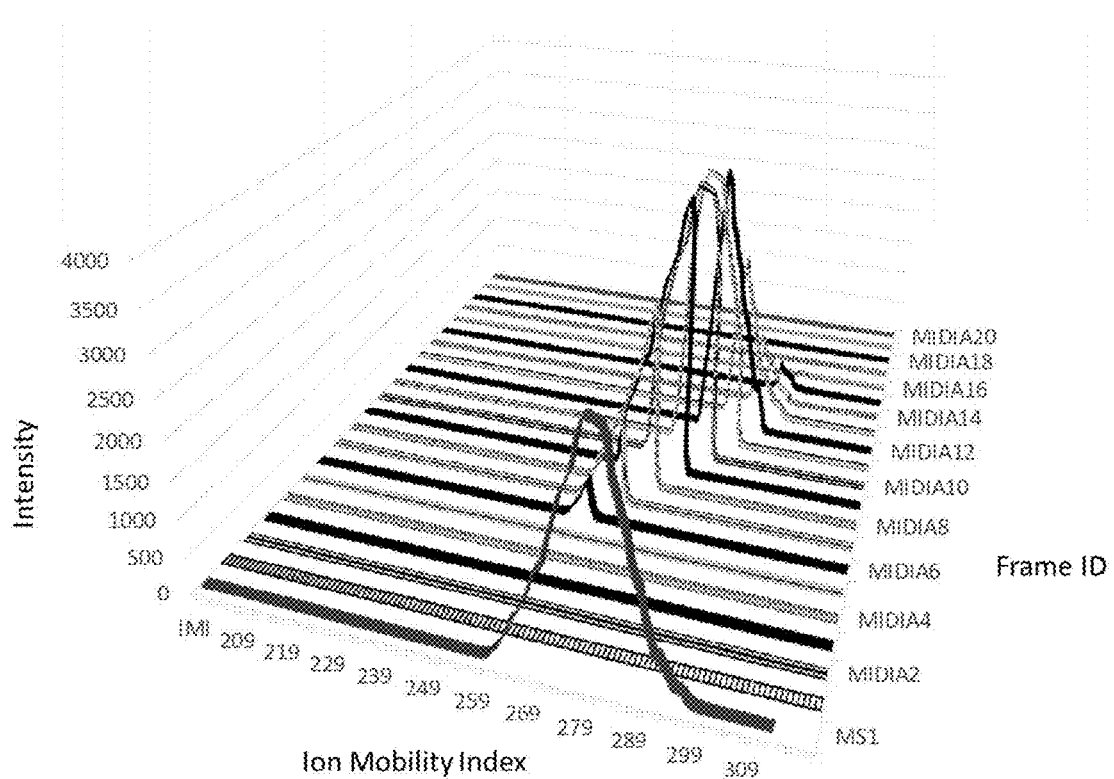
FIG. 23 is a three-dimensional plot showing the intensity obtained for the known precursor of FIG. 20 in an MS1 measurement and in each of 20 consecutive MIDIA frames.
Figure 24:
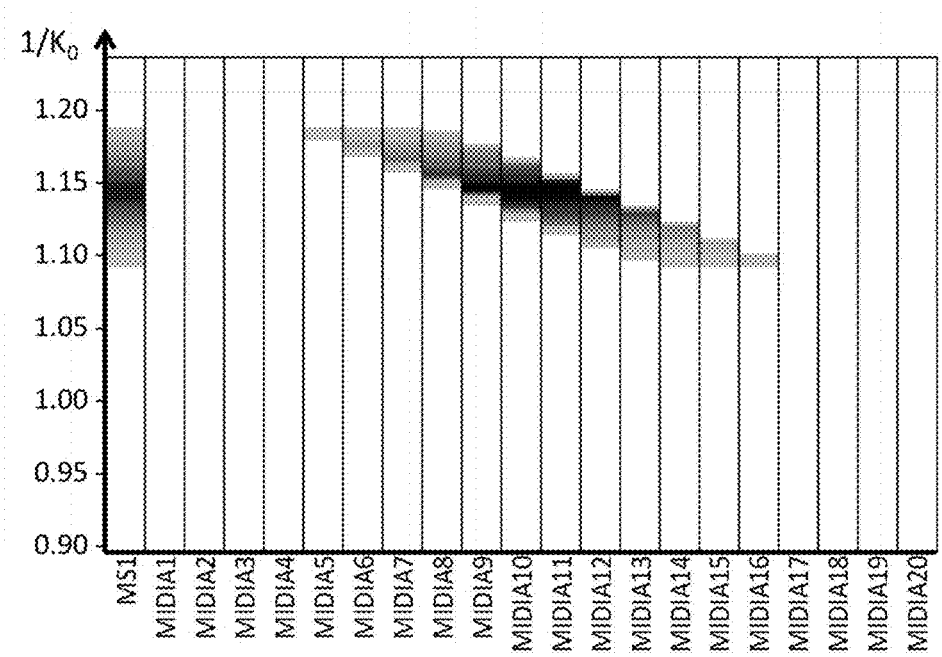
FIG. 24 shows the same data as FIG. 23, but presented in a heat map.

While in FIG. 20, only two intensity-IMI curves have been shown, FIG. 23 is a 3D-plot showing the intensity as a function of IMI for all 20 MIDIA frames. It is seen that the precursor can indeed be seen in a plurality of MIDIA frames, and the occurrence (in this case: intensity) of the precursor in each of those frames, in particular the step-like rise in intensity when the precursor for the first time falls into the mass window, contains very precise information about the m/z of the precursor that can be exploited in the methods of the invention.

FIG. 23 shows the same data as FIG. 22 but in a heat map, where darker colors represent higher intensities.

While the present invention has been described in terms of specific embodiments, it is understood that variations and modifications will occur to those in the art, all of which are intended as aspects of the present invention. Accordingly, only such limitations as appear in the claims should be placed on the invention.

What is claimed is:

1. A method of data independent combined ion mobility and mass spectroscopy analysis, comprising the following steps:
   introducing precursor ions into an ion mobility separator (IMS), sequentially releasing precursor ions from said IMS according to their ion mobility, introducing said released precursor ions into a mass filter which selectively transmits precursor ions having m/z values falling within a controllable mass window, fragmenting the precursor ions transmitted through said mass filter to generate fragment ions, carrying out a mass spectroscopy measurement on said fragment ions, wherein each fragment ion is associated with a mass window and an ion mobility (IM) range, and associating detected fragments with its corresponding precursor ion, wherein said IMS and said mass filter are controlled in a synchronized manner such as to carry out a plurality of IM scans, during which precursor ions of increasing or decreasing IM are successively released from said IMS, and during which the mass window of said mass filter is shifted continuously or stepwise towards lower or higher m/z values, respectively, wherein in said IM scans, adjacent mass windows that are associated with consecutive mass spectroscopy measurements of fragment ions overlap, such that the precursor ions transmitted through said mass filter during one IM scan are located in at least one continuous scan region in an m/z-IM plane which extends in a generally diagonal direction in said m/z-IM plane, wherein adjacent scan regions associated with different IM scans overlap in the m/z-direction, and wherein said step of associating a detected fragment with its corresponding precursor ion is based on determining or utilizing the corresponding mass windows and IM ranges associated with various occurrences of said fragment in said mass spectrometry measurement.

2. The method of claim 1, wherein in said IM scans, adjacent mass windows that are associated with consecutive mass spectroscopy measurements of fragment ions overlap by at least 30% of their width, and/or wherein adjacent scan regions associated with different IM scans overlap in the m/z-direction by at least 33% of their width in m/z direction.

3. The method of claim 1, wherein the occurrence said fragment corresponds to a relative or absolute intensity of the fragment in the mass spectrometry measurement.

4. The method of claim 1, wherein said step of associating a detected fragment with its corresponding precursor ion is based on assessing the consistency of a tentative precursor with the mass windows and IM ranges associated with the various occurrences of said fragment in the mass spectroscopy measurement, or, wherein said step of associating a detected fragment with its corresponding precursor ion comprises determining an intersection of mass windows associated with the occurrences of said fragment in said mass spectroscopy measurement, and identifying the corresponding precursor ion based at least in part on this intersection.

5. The method of claim 1, further comprising a step of carrying out MS1 mass spectroscopy measurements in an operation mode, in which the mass filter and the fragmentation are deactivated, such that all precursor ions sequentially released from the IMS are subjected to mass spectroscopy without fragmentation, to thereby obtain m/z spectra as a function of ion mobility of the precursor ions.

6. The method of claim 5, wherein based on m/z spectra of said precursor ions, a fingerprint of at least one precursor ion is established, which fingerprint comprises a set of mass windows and associated IM ranges among the mass windows and associated IM ranges covered by said IM scans which are consistent with the representation of said at least one precursor ion in said m/z spectra.

7. The method of claim 6, wherein said step of associating a detected fragment with its corresponding precursor comprises a step of establishing a set of mass windows and corresponding IM ranges of the mass filter and IMS associated with the occurrences of said detected fragment and comparing this set with the fingerprint of one or more precursors.

8. The method of claim 1, further comprising a step of carrying out a pseudo-MS2 measurement on precursor ions, in which said IMS and said mass filter are controlled in a synchronized manner such as to carry out the same type of overlapping IM scans as in the mass spectroscopy measurement on the fragment ions, but without fragmenting said precursor ions.

9. The method of claim 8, wherein the step of associating a detected fragment with its corresponding precursor is based on a comparison, correlation or matching of said pseudo-MS2 data and true MS2 data obtained in said mass spectroscopy measurement on said fragment ions.

10. The method of claim 5, further comprising a step of predicting or calculating, based on the representation of a precursor in the MS1 mass spectroscopy measurement, an expected occurrence for corresponding fragments with respect to at least IM range and number of IM scan among said plurality of IM scans, and wherein said step of associating a detected fragment with its corresponding precursor is based on a comparison, correlation or matching of this expected occurrence with true MS2 data obtained in said mass spectroscopy measurement on said fragment ions.

11. The method of claim 5, further comprising a step of predicting or calculating, based on true MS2 data obtained in said mass spectroscopy measurement for a given fragment, an expected intensity distribution for a possible precursor as a function of at least IM and m/z, and wherein said step of associating a detected fragment with its corresponding precursor is based on a comparison, correlation or matching of this expected intensity distribution for the possible precursor with data obtained in said MS1 mass spectroscopy measurement.

12. The method of claim 10, wherein said step of predicting or calculating is carried out using a model or algorithm based, at least in part, on one or more of a matrix-based method, a neural network, random forests, a support vector machine, or other methods of machine learning.

13. The method of claim 12, further comprising a step of carrying out a pseudo-MS2 measurement on precursor ions, in which said IMS and said mass filter are controlled in a synchronized manner such as to carry out the same type of overlapping IM scans as in the mass spectroscopy measurement on the fragment ions, but without fragmenting said precursor ions, wherein said model or algorithm is derived or trained, at least in part, using results of said pseudo-MS2 measurement as ground truth data.

14. The method of claim 1, wherein in said m/z-IM plane, said precursors have an average extension $\Delta IM_{precursor}$, wherein a shift of the edges of adjacent scan regions of said IM scans with respect to each other in the m/z direction is accompanied by an offset $\Delta IM_{frame}$ of the edges in IM direction between the edges of adjacent scan regions, and wherein the shift of adjacent scan regions is adapted to said average precursor extension $\Delta IM_{precursor}$ such that $\Delta IM_{precursor} \geq \Delta IM_{frame}$.

15. The method of claim 1, wherein said mass filter is a quadrupole RF device, and wherein said mass spectroscopy is carried out using a TOF mass analyzer.

16. The method of claim 1, wherein said IMS is one of a trapped IMS (TIMS) device, a drift type IMS device, and a travelling wave IMS device.

17. The method of claim 16, wherein said TIMS device comprises a first TIMS and a second TIMS, wherein said first TIMS is configured for constantly receiving precursor ions and transferring received precursor ions in a time controlled manner to the second TIMS, and said second TIMS is configured for carrying out said IM scans in which precursor ions are successively released from said second TIMS according to their ion mobility.

18. The method of claim 1, further comprising a step of providing said precursor ions by separating precursor molecules from a sample and ionizing said precursor molecules, wherein said separation of precursor molecules from said sample is carried out by liquid chromatography.

19. An apparatus for data independent combined ion mobility and mass spectroscopy analysis, said apparatus comprising:
an ion mobility separator (IMS) for receiving and sequentially releasing precursor ions from said IMS according to their ion mobility,
a mass filter arranged to receive said released precursor ions and to selectively transmit precursor ions having m/z values falling within a controllable mass window,
a fragmentation device for fragmenting the precursor ions transmitted through said mass filter to generate fragment ions,
an apparatus for carrying out a mass spectroscopy measurement on said fragment ions, wherein each fragment ion is associated with a mass window and an ion mobility (IM) range, and a control system,
wherein said control system is configured to control said IMS and said mass filter in a synchronized manner such as to carry out a plurality of IM scans, during which precursor ions of increasing or decreasing IM are successively released from said IMS, and during which the mass window of said mass filter is shifted continuously or stepwise towards lower or higher m/z values, respectively,
wherein said control system is configured to control said IMS and said mass filter in a synchronized manner such that, in said IM scans, adjacent mass windows that are associated with consecutive mass spectroscopy measurements of fragment ions overlap, such that the precursor ions transmitted through said mass filter during said IM scan are located in at least one continuous scan region in an m/z-IM plane which extends in a generally diagonal direction in said m/z-IM plane,
wherein said control system is configured to control said IMS and said mass filter in a synchronized manner such that adjacent scan regions associated with different IM scans overlap in the m/z-direction.

20. The apparatus of claim 19, wherein in said IM scans, adjacent mass windows that are associated with consecutive mass spectroscopy measurements of fragment ions overlap by at least 30% of their width,
and/or wherein said control system is configured to control said IMS and said mass filter in a synchronized manner such that adjacent scan regions associated with different IM scans overlap in the m/z-direction by at least 33%, of their width in m/z direction.

21. The apparatus of claim 19, wherein said control system is further configured for associating a detected fragment with its corresponding precursor ion based on assessing the consistency of a tentative precursor with the mass windows and IM ranges associated with the various occurrences of said fragment in the mass spectroscopy measurement, or wherein said control system is further configured for associating a detected fragment with its corresponding precursor ion, wherein said associating comprises determining an intersection of mass windows associated with the occurrences of said fragment in said mass spectroscopy measurement, and identifying the corresponding precursor ions based at least in part on this intersection.

22. The apparatus of claim 19, wherein said control system is further configured for controlling the apparatus to carry out MS1 mass spectroscopy measurements in an operation mode, in which the mass filter and the fragmentation device are deactivated, such that all precursor ions sequentially released from the IMS are subjected to mass spectroscopy without fragmentation, to thereby obtain m/z spectra as a function of ion mobility of the precursor ions.

23. The apparatus of claim 22, wherein said control system is configured for establishing, based on said m/z spectra of said precursor ions, a fingerprint of at least one precursor ion, which fingerprint comprises a set of mass windows and associated IM ranges among the mass windows and associated IM ranges covered by said IM scans which are consistent with the representation of said at least one precursor ion in said m/z spectra.

24. The apparatus of claim 23, wherein said control system is configured for associating a detected fragment with its corresponding precursor, wherein said associating comprises establishing a set of mass windows and corresponding IM ranges of the mass filter and IMS associated with the occurrences of said detected fragment and comparing this set with the fingerprint of one or more precursors.

25. The apparatus of claim 19, wherein said mass filter is a quadrupole RF device.

26. The apparatus of claim 19, wherein said control system is configured for controlling the apparatus to carry out a pseudo-MS2 measurement on precursor ions, in which said IMS and said mass filter are controlled in a synchronized manner such as to carry out the same type of overlapping IM scans as in the mass spectroscopy measurement on the fragment ions, but without fragmenting said precursor ions.

27. The apparatus of claim 26, wherein said control system is configured for associating a detected fragment with its corresponding precursor based on a comparison, correlation or matching of said pseudo-MS2 data and true MS2 data obtained in said mass spectroscopy measurement on said fragment ions.

28. The apparatus of claim 22, wherein said control system is configured for predicting or calculating, based on the representation of a precursor in the MS1 mass spectroscopy measurement, an expected occurrence for corresponding fragments with respect to at least IM range and number of IM scan among said plurality of IM scans, and further configured to associate a detected fragment with its corresponding precursor based on a comparison, correlation or matching of this expected occurrence with true MS2 data obtained in said mass spectroscopy measurement on said fragment ions.

29. The apparatus of claim 22, wherein said control system is configured for predicting or calculating, based on true MS2 data obtained in said mass spectroscopy measurement for a given fragment, an expected intensity distribution for a possible precursor as a function of at least IM and m/z, and further configured for associating a detected fragment with its corresponding precursor based on a comparison, correlation or matching of this expected intensity distribution for the possible precursor with data obtained in said MS1 mass spectroscopy measurement.

30. The apparatus of claim 28, wherein said control system is configured for carrying out said predicting or calculating using a model or algorithm based, at least in part, on one or more of a matrix-based method, a neural network, random forests, a support vector machine, or other methods of machine learning.

31. The apparatus of claim 19, wherein said IMS is one of a trapped IMS (TIMS) device, a drift type IMS device, and a travelling wave IMS device, and/or wherein said mass spectroscopy apparatus is a TOF mass analyzer.

32. The apparatus of claim 31, wherein said TIMS device comprises a first TIMS and a second TIMS, wherein said first TIMS is configured for constantly receiving precursor ions and transferring received precursor ions in a time controlled manner to the second TIMS, and said second TIMS is configured for carrying out said IM scans in which precursor ions are successively released from said second TIMS according to their ion mobility.

33. The apparatus of claim 19, wherein said apparatus further comprises a separator and an ionizing device for providing said precursor ions by separating precursor molecules from a sample and ionizing said precursor molecules, wherein said separator is a liquid chromatography device.

34. The apparatus of claim 19, wherein the control system is configured to control said IMS and said mass filter in a synchronized manner such that
  said precursors have an average extension $\Delta IM_{precursor}$ in said m/z-IM plane,
  a shift of the edges of adjacent scan regions of said IM scans with respect to each other in the m/z direction is accompanied by an offset $\Delta IM_{frame}$ of the edges in IM direction between the edges of adjacent scan regions, and
  the shift of adjacent scan regions is adapted to said average precursor extension $\Delta IM_{precursor}$ such that $\Delta IM_{precursor} \geq \Delta IM_{frame}$.

* * * * *